United States Patent [19]

Yamamori et al.

[11] Patent Number: 5,452,280
[45] Date of Patent: Sep. 19, 1995

[54] DISK LOADING SYSTEM

[76] Inventors: Eiji Yamamori; Masanori Akiyama, both of c/o Sony Corporation 7-35, Kitashinagawa 6-chome, Shinagawa-ku, Tokyo, Japan

[21] Appl. No.: 930,762

[22] Filed: Aug. 13, 1992

[30] Foreign Application Priority Data

Aug. 20, 1991 [JP] Japan .................................. 3-208152

[51] Int. Cl.6 .......................................... G11B 17/035
[52] U.S. Cl. .............................. 369/77.2; 360/99.06; 360/99.12
[58] Field of Search ............... 360/99.06, 99.12, 97.01; 369/77.2

[56] References Cited

U.S. PATENT DOCUMENTS

| | | | |
|---|---|---|---|
| 4,539,613 | 9/1985 | Suyama et al. | 360/99.0' |
| 4,694,362 | 9/1987 | Oosaka et al. | 360/99.06 |
| 4,833,553 | 5/1989 | Noda et al. | |
| 4,887,174 | 12/1989 | Tezuka | 360/99.06 |
| 4,994,930 | 2/1991 | Uehara | 360/97.01 |
| 5,355,357 | 10/1994 | Yamamori et al. | 369/77.2 |

FOREIGN PATENT DOCUMENTS

| | | |
|---|---|---|
| 0144068A2 | 6/1985 | European Pat. Off. |
| 0194138A2 | 9/1986 | European Pat. Off. |
| 11964 | 1/1986 | Japan ................. 360/99.06 |
| 3-216855 | 9/1991 | Japan . |

Primary Examiner—Edward K. Look
Assistant Examiner—James A. Larson
Attorney, Agent, or Firm—Limbach & Limbach

[57] ABSTRACT

A disk loading system comprises a cartridge holder having a cartridge receiver for loading a disk cartridge, and a shutter opening arm disposed to the cartridge holder and rotatable by loading/removing of the disk cartridge. The system further comprises a first lever rotatably mounted to the cartridge holder so as to provide to the shutter opening arm a torque in the shutter opening direction, a second lever rotatable by a torque of the first lever in the shutter closing direction, and a cartridge stop lug rotatably disposed to undergo a pressing force in the cartridge removing direction by rotation of the second lever. This cartridge stop lug is biased in the direction to stop the disk cartridge within the cartridge receiver.

7 Claims, 21 Drawing Sheets

DISK LOADING SYSTEM

BACKGROUND OF THE INVENTION

The present invention relates to a disk loading system which is suitable, for example, for use in a portable disk player.

Generally, there is known a disk regeneration system which records information such as a Japanese dictionary or an English-Japanese dictionary on an optical disk, and reads out information therefrom to display same on a display part.

This disk regeneration system comprises a disk drive for rotating the information disk such as an optical disk having information recorded so as to read out and regenerate same, a keyboard for selecting information recorded on the disk to be read out and generated, and a display for displaying read outs from the information disk as character information.

With the disk regeneration system of this type, the disk drive, keyboard, and display are an independent unit, respectively. A combination of these units are usable on a desk, etc., but not portable since each unit is large in size.

On the other hand, with the information disk such as an optical disk, since a recording density is remarkably improved, a piece of optical disk with a diameter of 8 cm can record information corresponding to a volume of a Japanese dictionary or an English-Japanese dictionary.

Under these conditions, a demand is to provide a system including such small optical disk capable of a high density recording, which can easily read out and regenerate desired information in a desired place so as to display same on the display unit as visible characters.

Recently, to meet such demand, disk players have been proposed wherein the disk drive, keyboard, and display constructed independently are integrated to reduce the size of the entirety of the disk player, so as to increase the portability thereof. One of the disk players is disclosed in JP-A 3-216855 entitled "Portable Disk Player".

With a disk cartridge remover system for electronic equipment such as a portable disk player of this type, a shutter opening arm is engaged and disengaged by a link mechanism which is operated by rotation of a cartridge holder. In this arrangement, return action (action in the shutter closing direction) of the shutter opening arm is restricted by the link mechanism. That is, in case that a disk cartridge is incorrectly received in the disk cartridge, it is necessary to remove the disk cartridge from the cartridge holder after releasing engagement of the shutter opening arm by rotation of the cartridge holder. As a result, the number of reset operations of the cartridge is increased upon insertion error of the disk cartridge, resulting in complicated reset operation thereof.

Further, with a disk clamper mounting system for an electronic equipment such as a portable disk player of this type, it comprises a clamper mounting plate for holding a disk clamper rotatably mounted to the cartridge holder via a support shaft, and a spring for providing thereto a biasing force in the direction of an opening window for insertion of a clamper. That is, the support shaft and the spring are needed in addition to the clamper mounting plate for mounting of the disk clamper to the cartridge holder, resulting an increased cost due to additional parts, and complicated structure and assembling work.

Therefore, an object of the present invention is to provide a disk cartridge remover system which allows easy reset operations of a cartridge with reduced number of reset operations thereof upon insertion error of a disk cartridge.

Another object of the present invention is to provide a disk clamper mounting system which reduces costs, simplifies structure and assembly work with a reduced number of parts.

SUMMARY OF THE INVENTION

According to one aspect of the present invention, there is provided a system for loading a disk, comprising:
- a chasis having a disk loading part for loading the disk and a drive for driving the disk, said disk loading part having a disk table;
- a holder attached to said chassis, said holder being movable between an open position to open said disk loading part and a closed position to close said disk loading part;
- a disk clamp means, mounted on said holder and opposed to said disk table, for clamping the disk in cooperation with said disk table when said holder is in the closed position, wherein said disk clamp means includes a disk clamper for holding the disk in cooperation with said disk table, and a clamper mounting plate for supporting said disk clamper, said clamper mounting plate always biasing said disk clamper to said disk table; and
- a disk clamp releasing means for releasing said clamping of the disk by said disk clamp means in accordance with a movement of said holder from said closed position to said open position.

According to another aspect of the present invention, there is provided a system for loading a disk, comprising:
- a chassis having a disk loading part for loading the disk and a drive for driving the disk;
- a cartridge holder movably mounted on said chassis for receiving a disk cartridge having the disk, said cartridge holder being rotatable between a first position wherein said disk cartridge can be inserted and a second position wherein the disk within said disk cartridge is disposed on a disk table in said disk loading part; and
- a shutter opening means, within said cartridge holder, for opening a shutter of said disk cartridge upon an insertion of said disk cartridge in the cartridge holder, said shutter opening means being movable between an ejecting position to effect said disk cartridge and a receiving position to receive said disk cartridge; and
- a bias means for producing a biasing force to always bias said shutter opening means to said ejecting position; and
- a stop means, attached to said cartridge holder, for stopping said disk cartridge in a predetermined position,
- wherein when said disk cartridge is received within the cartridge holder, said shutter opening means is moved against said biasing force of said bias means to carry out said opening of said shutter, and when said disk cartridge is inserted to the predetermined position, further movement of said disk cartridge is prevented; and a disk clamp means, opposed to said disk table, for clamping the disk in cooperation with said disk table when said cartridge holder is in a closed position;

wherein said disk clamp means includes a disk clamper for holding the disk in cooperation with said disk table, and a clamper mounting plate for supporting said disk clamper, said clamper to said disk table, wherein said clamper mounting plate is elastically displaceable; and a disk clamp releasing means for releasing said clamping of the disk by said disk clamp means in accordance with a movement of said cartridge holder from said second position to said first position.

DETAILED DESCRIPTION OF THE INVENTION

Figure 1:
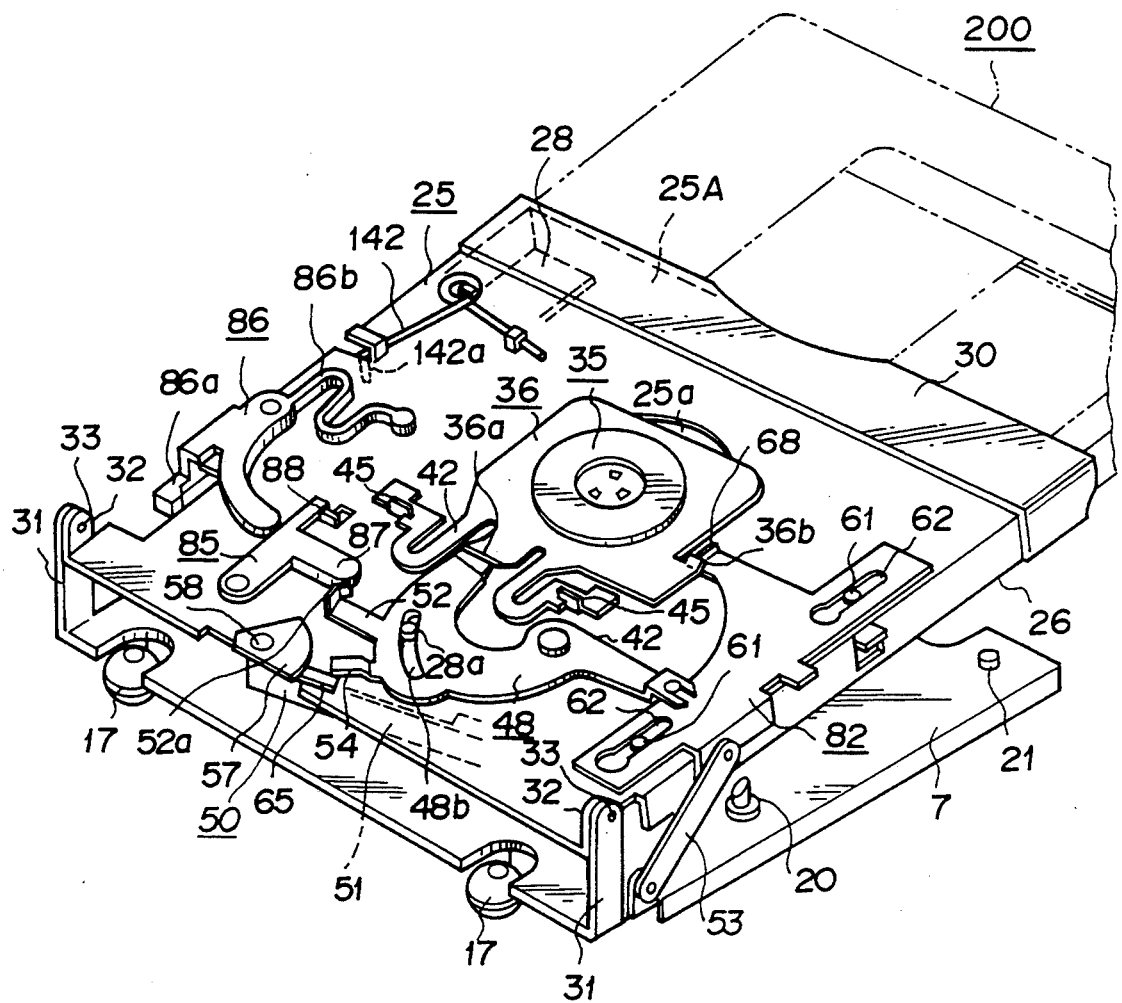
FIG. 1 is a perspective view showing a preferred embodiment of a disk loading system according to the present invention.

Referring to the drawings, preferred embodiments of the present invention will be described. A disk player to which the present invention applied includes selectively a recording medium such as an optical disk (so-called CD-ROM) housed within a cartridge main body of a disk cartridge and having information recorded such as a Japanese dictionary or an English-Japanese dictionary, or an optical disk (so-called compact disk) having signals recorded such as music signals, and provides a regeneration function and display function of the optical disk for displaying, as visible information, information read out therefrom and regenerated on a display part.

Figure 2:
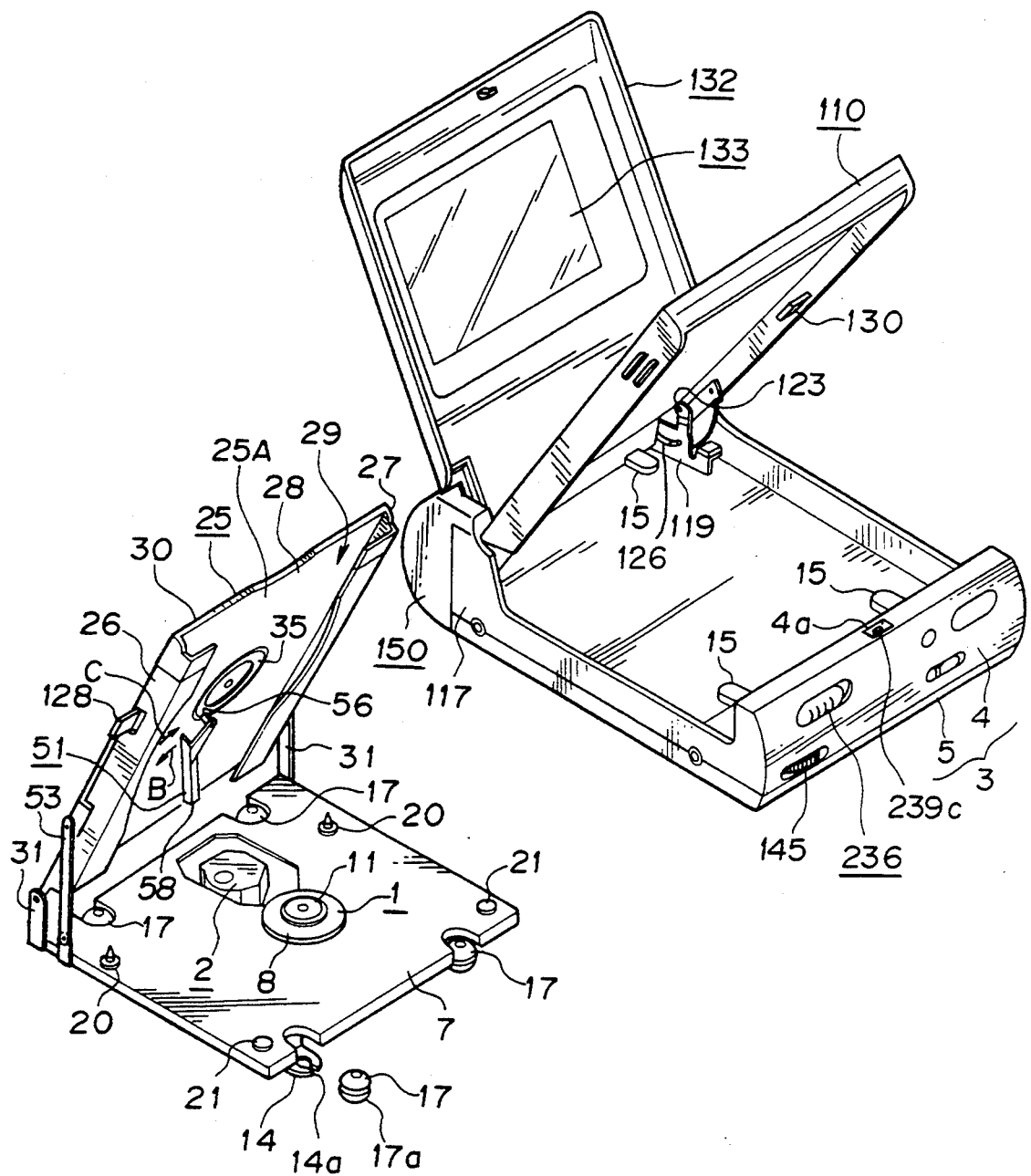
FIG. 2 is a perspective exploded view showing a disk player.
Figure 3:
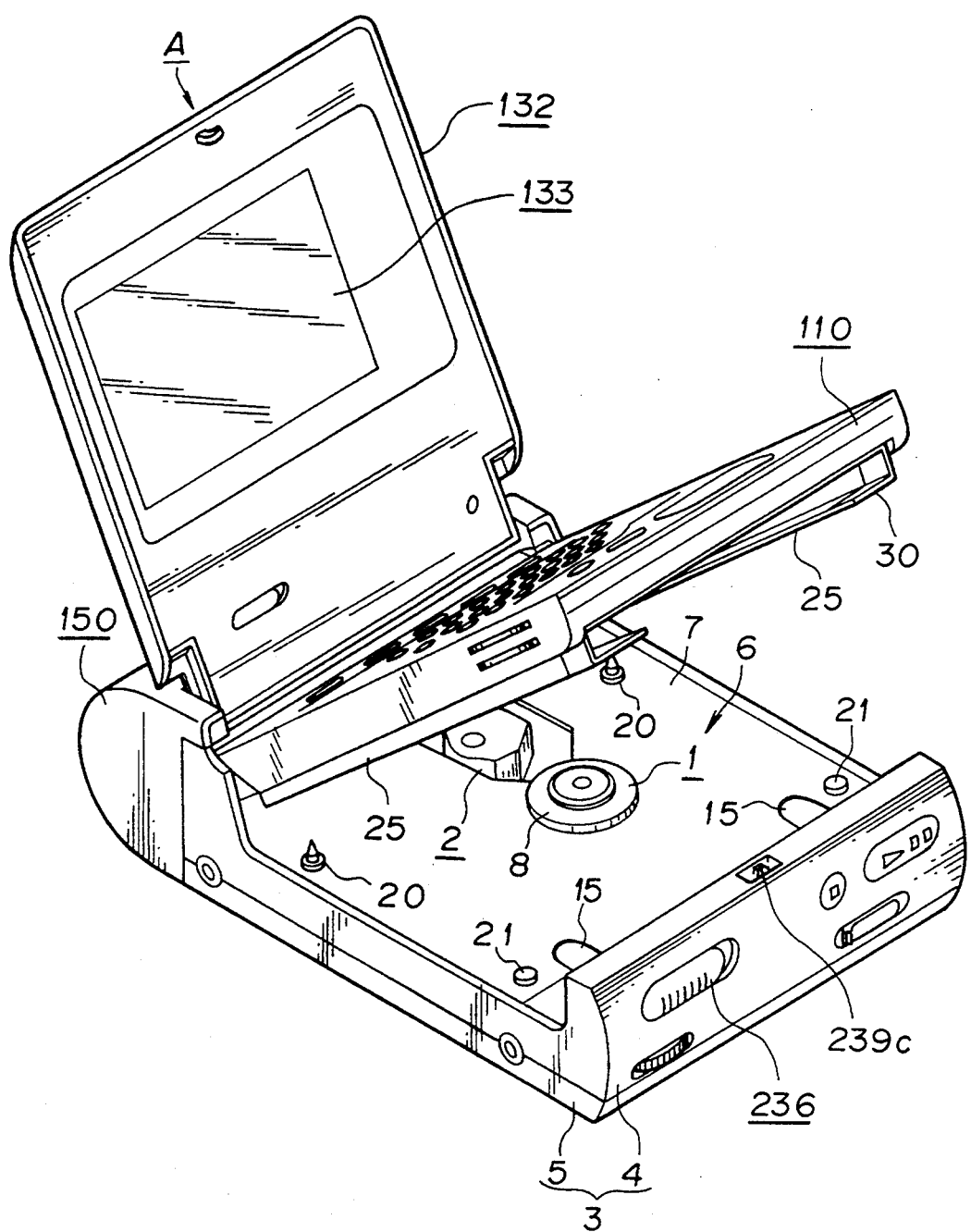
FIG. 3 is a view similar to FIG. 1, showing the disk player with first and second covers opened.
Figure 4:
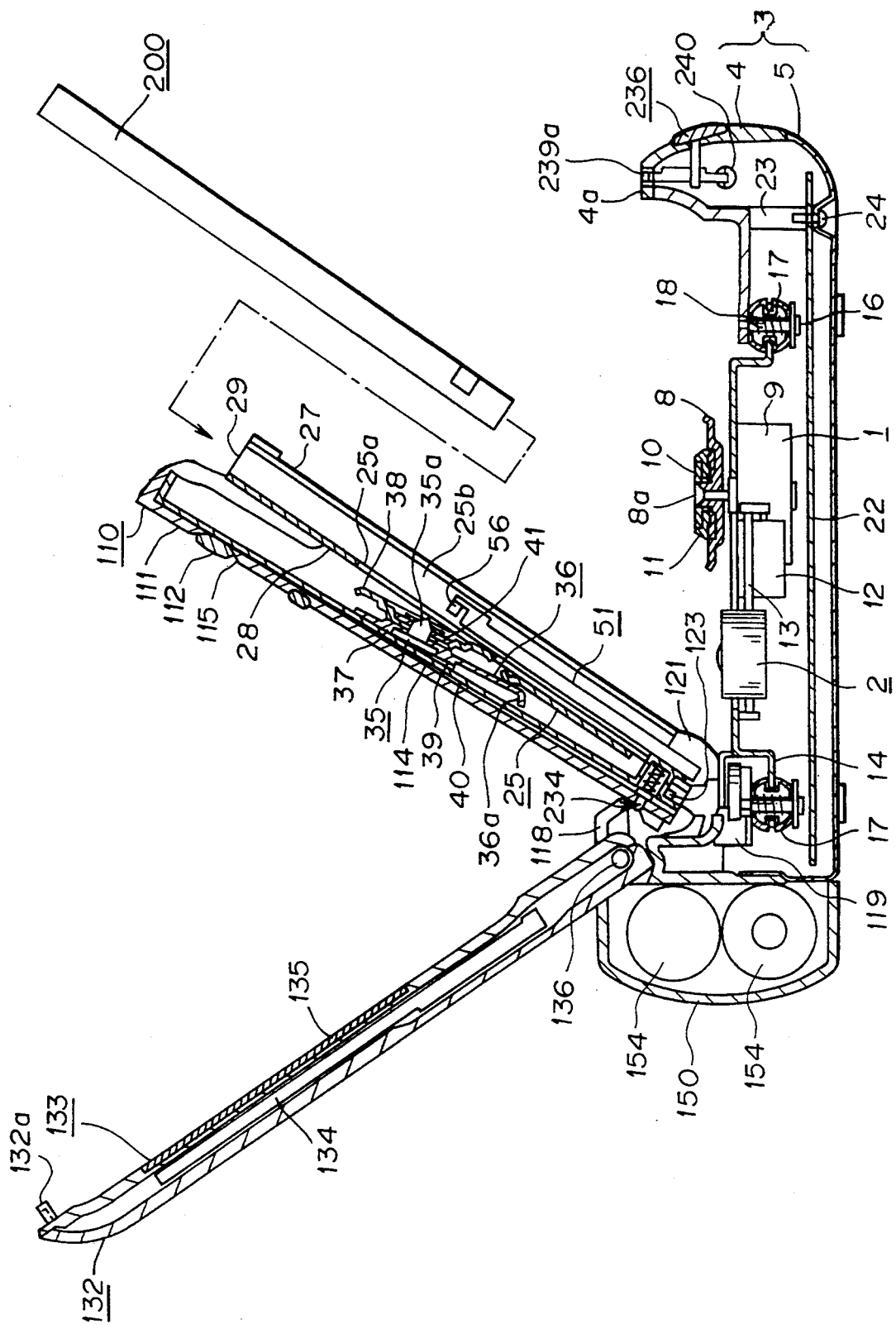
FIG. 4 is a sectional view showing the disk player.

Referring first to FIGS. 2-4, a disk player main body will be described.

The disk player, designated by reference letter A, provides the disk player main body 3 which receives a disk drive 1 for driving an optical disk housed within a cartridge main body of a disk cartridge or an optical disk not housed within the disk cartridge, and an optical pickup 2 has an information signal readout means for reading out and regenerating information signals recorded on the optical disk which is rotated by the disk drive 1.

The disk player main body 3 comprises a squared box-shaped cabinet 4 with through-holes 4a, 4b and a bottom plate 5 for closing an opening of the cabinet 4 on the bottom side thereof, and it forms therein a disk loading part 6, shown in FIG. 3, capable of loading on the upper side thereof the disk cartridge having the optical disk with a diameter of 8 cm.

Additionally, in the disk player main body 3, the disk drive 1 and optical pickup 2 are mounted to a chassis base plate 7, as shown in FIG. 2 stamped out from a metal sheet, and are disposed in the cabinet 4 via this chassis base plate 7.

As shown in FIG. 4, the disk drive 1 comprises a disk table 8 which rotates with the optical disk, and a spindle motor 9 for driving the disk table 8. The spindle motor 8 is mounted to the chassis base plate 7 on the lower side thereof, with a spindle 10 protruding from the upper side thereof, whereas the disk table 8 is mounted to the spindle 10 at the point thereof for unitary rotation. Arranged in a center portion of the disk table 8 is a centering member 11 engaged with a center hole of the optical disk so as to adjust the rotational center of disk table 8 to the center of the optical disk.

The centering member 11 is biased by a coil spring, etc. to be movable in the axial direction of the spindle 10. When the optical disk is set on the disk table 8, the centering member 11 is engaged with the center hole of the optical disk in elastically displacing in the axial direction of the spindle 10 so as to adjust the center hole of the optical disk to the rotational center of the disk table 8.

On the other hand, the optical pickup 2 is supported by a feed screw 13 which is driven by a pickup feed motor 12 located below the chassis base plate 7, and a slide guide block (not shown) located below the chassis base plate 7, and it is linearly movable in the radial direction of the optical disk on the disk table 8. The movement of the optical pickup 2 in the radial direction of the optical disk is produced by rotation of the feed screw 13 on drive of the pickup feed motor 12.

In such a manner, the disk drive 1 and optical pickup 2 are mounted to the chassis base plate 7 which is disposed within the cabinet 4 via L-shaped mounting lugs 14 obtained by bending downward parts of corners of the chassis base plate 7. Each mounting lug 14 is fixed to a mounting support lug 15 protuberantly arranged in the vicinity of a corner of the cabinet 4 via a screw 16. A buffer member 17 is interposed between each mounting lug 14 and mounting support lug 15 so as not to block feed operation of the optical pickup 2 and rotation of the optical disk by the disk drive 1 due to perturbation to be transmitted to the chassis base plate 7 when an impact or the like is given to the cabinet 4. The buffer member 17 is made of elastic material such as a rubber, etc. having a relatively large biasing force, and is so constructed as to have a predetermined elastic force by using a coil spring 18 if necessary. Additionally, the buffer member 17 has an engagement groove 17a engaged with a recess 14a which is formed with the mounting lug 14, and is interposed between the mounting lug 14 and the mounting support lug 15 when the chassis base plate 7 is mounted to the cabinet 4.

Disposed to the chassis base plate 7, shown in FIG. 3 on the upper side thereof are positioning guide pins 20 and height positioning pins 21 for positioning horizontally and vertically the disk cartridge within the disk loading part 6.

As shown in FIG. 4, disposed within the disk cartridge part are an electric circuit substrate 22 having a signal processing circuit for processing information signal obtained by reading out the optical disk by the optical pickup 2, and electric circuits indispensable to construction of the disk regeneration system, such as a control circuit for controlling movement of the optical pickup 2, etc. The electric circuit substrate 22 is mounted by screws 24 to a boss 23 which extends downward in the cabinet 4.

Figure 8:
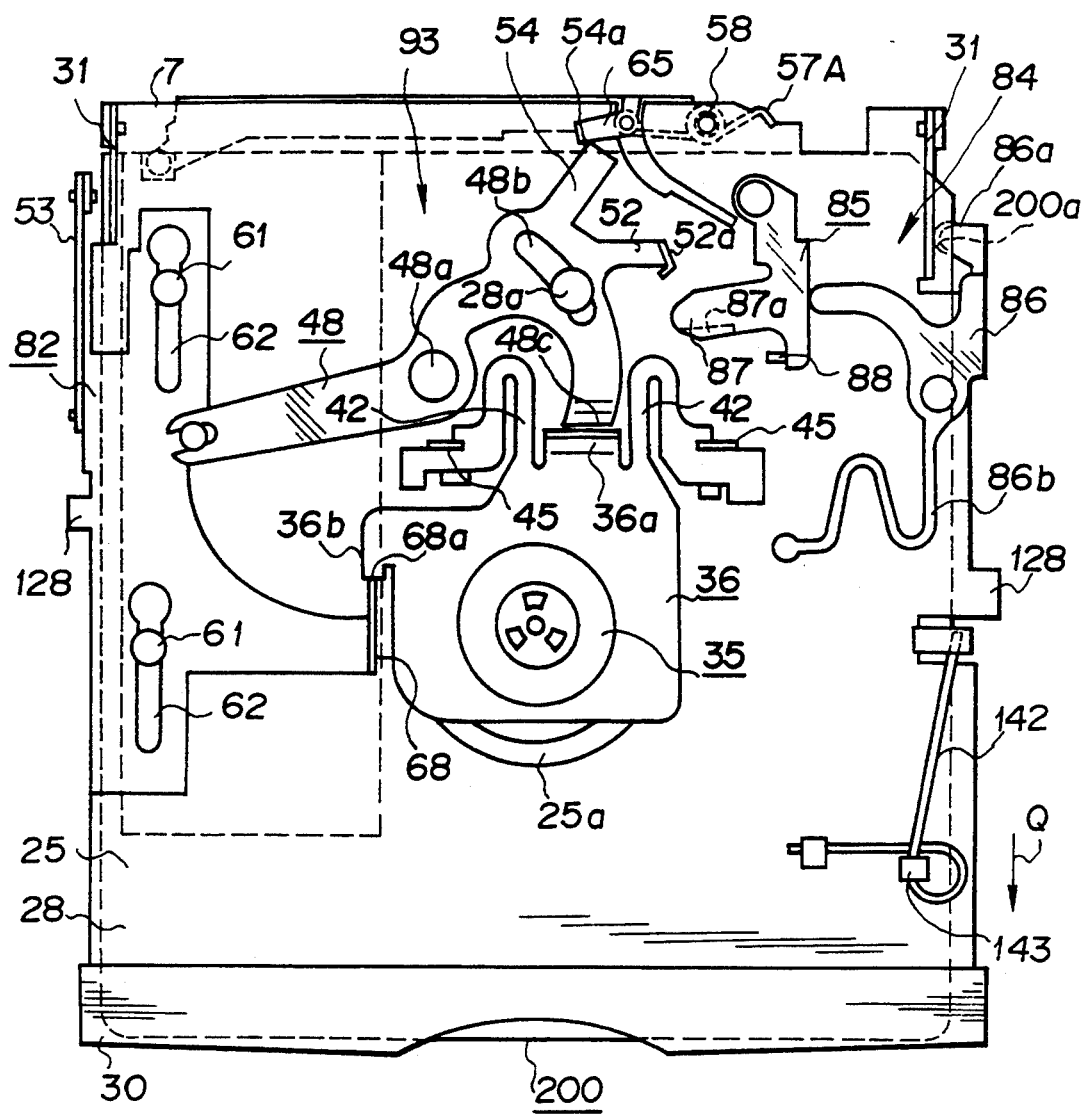
FIG. 8 is a view similar to FIG. 7, showing the cartridge holder after loading the disk cartridge.
Figure 9:
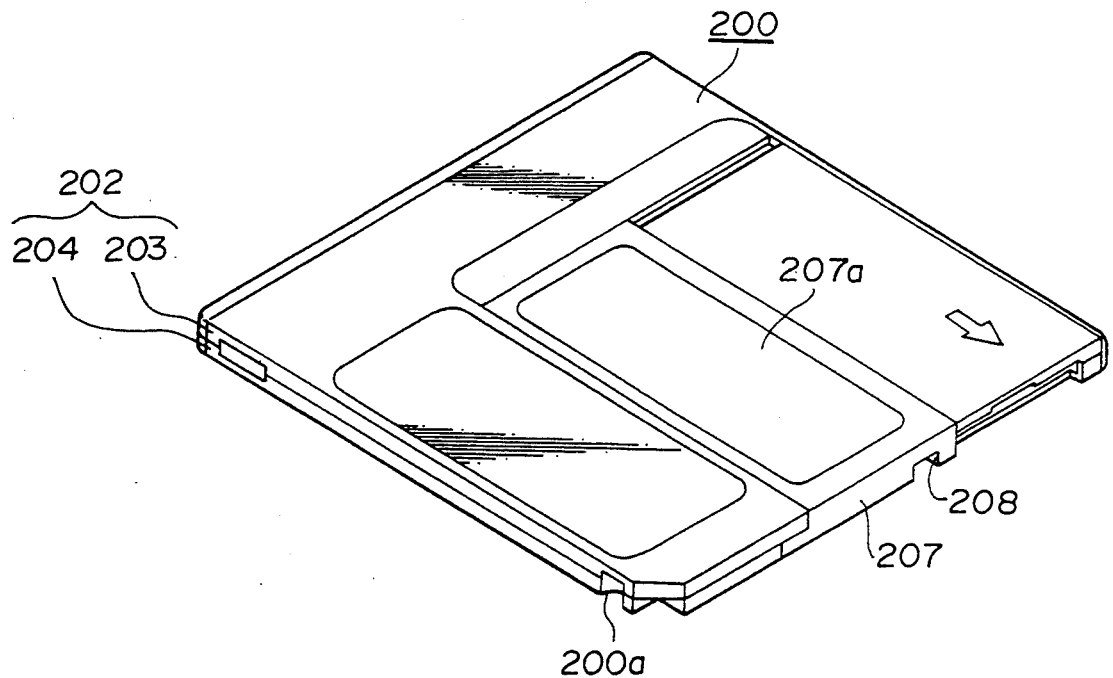
FIG. 9 is a view similar to FIG. 3, showing an upper side of the disk cartridge.
Figure 10:
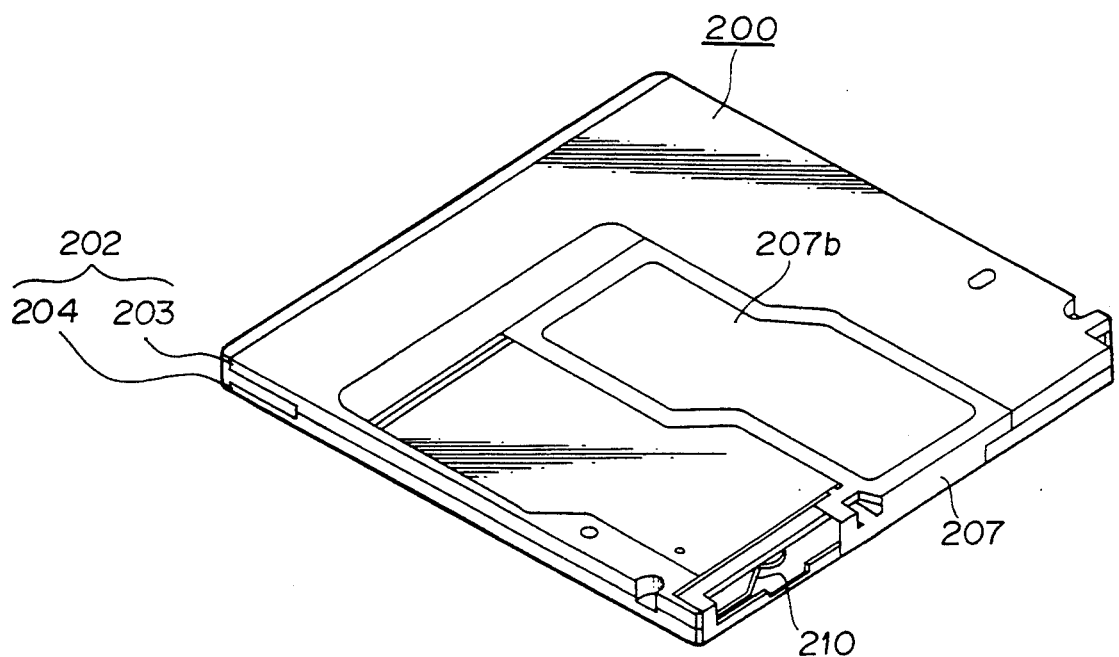
FIG. 10 is a view similar to FIG. 9, showing a lower side of the disk cartridge.
Figure 11:
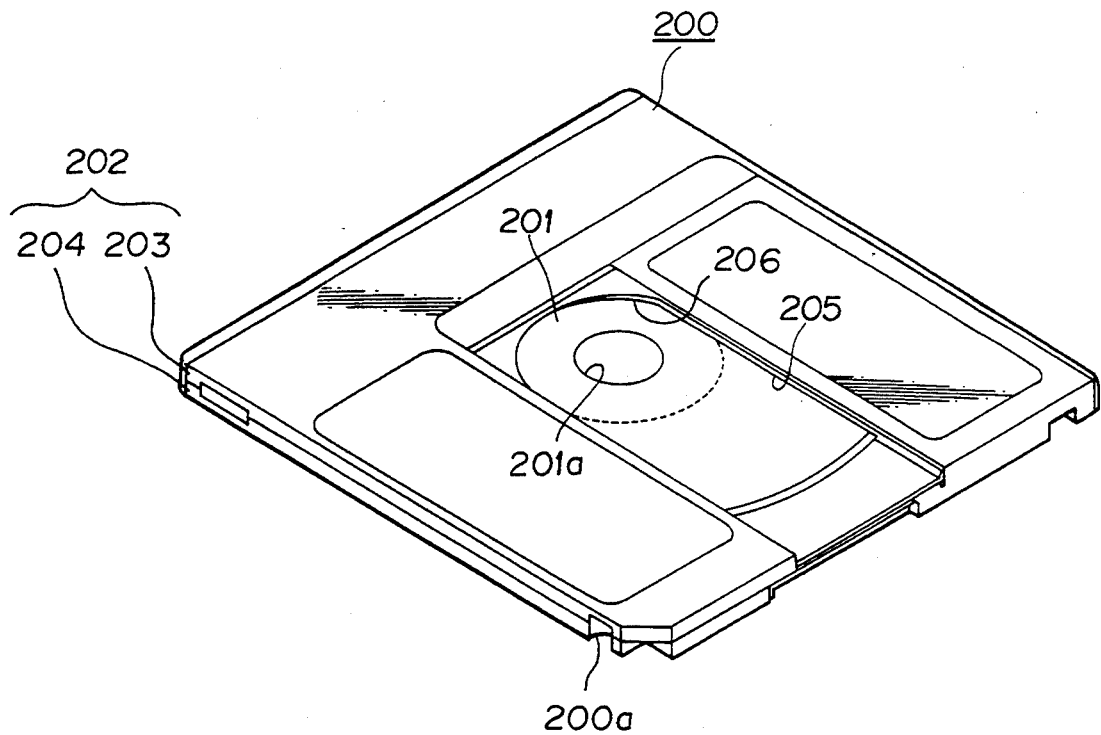
FIG. 11 is a view similar to FIG. 10, showing the upper side of the disk cartridge with a shutter opened.
Figure 12:
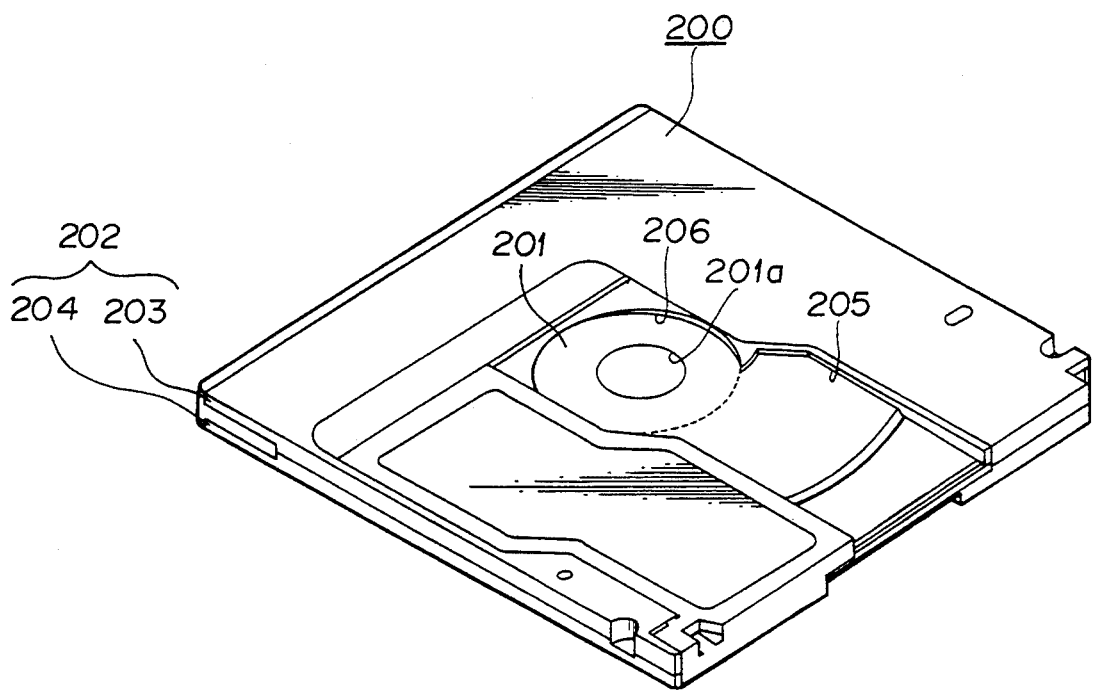
FIG. 12 is a view similar to FIG. 11, showing the lower side of the disk cartridge with the shutter opened.

Referring next to FIGS. 1-2 and 8, a cartridge holder will be described.

The disk cartridge holder, designated by reference numeral 25, has a clamper insertion window 25a in a position thereof corresponding to the disk table 8, and is rotatably mounted to the chassis base plate 7. Referring to FIGS. 9-12, the cartridge holder 25 serves to dispose a disk cartridge 200 on the disk loading part 6 within the disk player main body 3 so as to set the optical disk 201 within the disk cartridge 200 on the disk table 8. Additionally, the cartridge holder 25 is rotatable between a down position wherein it stops to conceal the disk loading part 6, and an up position allowing insertion of the disk cartridge 200 wherein it stops to expose the disk loading part 6.

The disk cartridge 200 comprises the cartridge main body 202 having an upper half 203 and a lower half 204 which are connected to abut each other, and the optical disk 201 rotatably received therein.

The cartridge main body 202 has an opening window 205 which extends in the radial direction of the optical disk 201, and a disk table insertion opening 206 adjacent to the opening window 205 and substantially in the center thereof, which the disk table 8 of the disk drive 1 for driving the optical disk 201 gets in. Movably mounted to the cartridge main body 202 is a shutter 207 made of a metal sheet with an U-shaped section and having a pair of upper and lower cover plates 207a, 207b for opening and closing the opening window 205 and the disk table insertion opening 206.

The shutter 207 is biased by a shutter closing spring 210 so that the disk cartridge 200 closes the opening window 205 and the disk table insertion opening 206 during nonuse. Additionally, the shutter 207 has on the front side thereof an engagement hole 208 with which a roller of a point of a shutter opening arm (which will be described hereinafter) is engaged. When the disk cartridge 200 is loaded in the cartridge holder 25, the shutter opening arm is rotated, and the shutter 207 is moved against biasing force of a shutter closing spring 210 in following rotation of the shutter opening arm. This movement of the shutter 207 causes the opening window 205 and the disk table insertion opening 206 to open.

The cartridge holder 25 for holding the disk cartridge 200 having such a construction is formed substantially in plate with a size sufficient to hold the disk cartridge 200, and it has two edges integrally formed with cartridge supports 26, 27 for supporting both edges of the disk cartridge 200, respectively. The cartridge supports 26, 27 are formed in L-shape, and obtained by bending both edges of a main plane 28 of the cartridge holder 25. A receiver 25A for inserting the disk cartridge 200 is formed between the cartridge supports 26, 27, and has a cartridge loading opening 29 at the front thereof which opens inside and outside. For easy and sure loading operation of the disk cartridge 200 to the cartridge holder 25, a plastic cartridge carrier 30 is protuberantly arranged at an upper edge of the cartridge loading opening 29. A lower side of the cartridge carrier 30 on the side of the cartridge loading opening 29 is formed in inclined guide face so as to guide insertion of the disk cartridge 200.

The cartridge loading opening 29 has a width smaller than a length of a diagonal line of the disk cartridge 200 to prevent the disk cartridge 200 from slantly getting in.

The cartridge holder 25 has rotation support lugs 32 on both sides of the rear end thereof supported to holder mounting lugs 31 on the chassis base substrate 7 via support shafts 33.

Referring next to FIGS. 1, 4 and 7-8, the disk clamper will be described.

The disk clamper, designated by reference numeral 35, is disposed to the main plane 28 of the cartridge holder 25 substantially in the center portion thereof via a clamper mounting plate 36. The disk clamper 35 is movable between the inside and outside of a clamper insertion window 25a of the cartridge holder 25 so as to hold the optical disk in cooperation with the disk table 8. Disposed through the clamper mounting plate 36 is a cylindrical part 39 protruding from the upper side of a disk pressing plate 38 for pressing the optical disk, thus preventing the disk clamper 35 from falling out of the clamper mounting plate 36 by a flange part 40 of the cylindrical part 39.

Specifically, the disk clamper 35 is playingly supported to the clamper mounting plate 36 so as to be axially movable and rotatable within the cylindrical part 39.

The disk clamper 35 has a face opposite to the disk table 8 on which a magnet 41 made of magnetic material such as a metal plate is installed to attract the disk table 8. The magnet 41 enables the optical disk to surely rotate with the disk table 8 when the disk clamper 35 holds the optical disk in cooperation with the disk table 8.

Additionally, the disk clamper 35 has in the face thereof opposite to the disk table 8 an engagement protrusion 35a to be engaged with a positioning engagement recess 8a of the disk table 8. When the disk clamper 35 is attracted on the disk table 8, the engagement protrusion 35a is engaged with the positioning engagement recess 8a, thus adjusting the disk clamper 35 to the rotational center of the disk table 8.

The clamper mounting plate 36 for supporting the disk clamper 35 is formed with a pair of U-shaped elastic support lug 42 to be located at the back of a base end part of the plate 36, which is engaged with a pair of support lugs 45 formed by erectly disposing a part of the main plane 28 of the cartridge holder 25. The clamper mounting plate 36 is thus elastically supported relative to the main plane 28 of the cartridge holder 25, and is biased in the direction as indicated by arrow A in FIG. 4 so that the disk clamper 35 is located in the cartridge holder 25 (clamper insertion window 25a). Additionally, the clamper mounting plate 36 has a rear edge formed with a lug 36a which is interposed between the pair of elastic support lugs 42 and protrudes rearward and slantly upward, and one side edge formed with an inclined lug 36b which protrudes forward and slantly upward.

Referring next to FIGS. 1-2 and 7-8, a shutter opening mechanism will be described.

The shutter opening mechanism, designated by reference numeral 50, is disposed to the cartridge holder 25, and is so constructed as to move the shutter 207 of the disk cartridge 200 to open the opening window 205 and the disk table insertion opening 206 of the cartridge main body 202, thus exposing outside a signal recording face of the optical disk 201, and an opening periphery of a center hole 201a. The shutter opening mechanism 50 comprises the shutter opening arm 51 which is rotatable by loading/removing of the disk cartridge 200 in/from the cartridge holder 25, and a torsion spring 57A for providing to the shutter opening arm 51 a resilient force in the cartridge drawing direction or shutter closing direction.

The shutter opening arm 51 of the shutter opening mechanism 50 has a long arm part 51a which provides at the point thereof a shutter closing roller 56 to be engaged with the pin engagement hole 208 of the shutter 207, and at the base end thereof an U-shaped support part 57. The support part 57 of the shutter opening arm 51 is supported to the cartridge holder 25 at the rear end thereof via a rotation support shaft 58, and it is rotatable on the rotation support shaft 58 in the directions as indicated by arrows B and C in FIG. 2. Additionally, at the base end of the shutter opening arm 51, a connecting arm 65 is disposed on the main plate 28 of the cartridge holder 25.

The rotation support shaft 58 is disposed to an L-shaped erection lug (not shown) obtained by bending a part of the cartridge holder 25 at the rear end thereof.

Referring next to FIGS. 1, 7-8, and 13-16, a disk clamper detachment mechanism and a disk cartridge removal mechanism will be described.

The disk clamper detachment mechanism, designated by reference numeral 93, comprises a connecting link 53 slidably mounted to the chassis base plate 7, a slide plate 82 moved by swing motion of the connecting link 53, and a clamper mounting plate rotating lever 48 rotated by movement of the slide plate 82, and it is so constructed as to detach the disk clamper 35 from the disk table 8 by rotation of the cartridge holder 25.

The slide plate 82 of the disk clamper detachment mechanism 93 has a pair of long holes 62 at a predetermined interval in the longitudinal direction thereof, which are engaged with a pair of slide pins 61 erectly disposed on the main plate 28 of the cartridge holder 25 on the upper side thereof. Disposed in the vicinity of a forward one 62 of the two long holes 62 is an extension lug 68 having a guide face 68a opposite to the inclined lug 36b, whereas slidably disposed in the vicinity of a rearward one 62 of the two long holes 62 is the clamper mounting plate rotating lever 48 having a support shaft 48a on the main plate 28 of the cartridge holder 25.

The clamper mounting plate rotating lever 48 has a long hole 48b which extends in the peripheral direction of a circle having the support shaft 48a as a center, and is engaged with a pin 28a erectly disposed on the main plate 28 of the cartridge holder 25, and an engagement protrusion 48c which is located forward in the longitudinal direction of the long hole 48b and between the two elastic support lugs 42, and is engaged with the lug 36a of the clamper mounting plate 36. Additionally, the clamper mounting plate rotating lever 48 has a lever pressing lug 52 including an inclined part 52a for lever stranding, and an arm pressing lug 54 including a pressing part 54a engageable with the connecting arm 65. The clamper mounting plate rotating lever 48 is rotated by movement of the slide plate 82, and the engagement protrusion 48c is slidably engaged with the lug 36a of the clamper mounting plate 36, thus detaching the disk clamper 35 from the disk table 8.

On the other hand, the disk cartridge remover mechanism, designated by reference numeral 84, comprises the cartridge holder 25 having the receiver 25A for loading the disk cartridge 200, the shutter opening arm 51 disposed to the cartridge holder 25 and rotatable by loading/removing of the disk cartridge 200, and a cartridge stop lever 86 for stopping the disk cartridge 200 in a rear stop position of the shutter opening arm 51.

The cartridge holder 25 of the disk cartridge remover mechanism 84 provides the clamper mounting plate rotating lever 48 as a first lever for providing to the shutter opening arm 51 rotation in the shutter opening direction as indicated by arrow B in FIG. 2, a cartridge lock releasing lever 85 as a second lever which rotates by torque of the clamper mounting rotating lever 48 in the shutter closing direction, and a cartridge stop lever 86 which rotates by rotation of the cartridge lock releasing lever 85.

The cartridge stop lever 86 includes a protrusion 86a engaged with a recess 200a having an opening on the side and bottom of the disk cartridge 200, and is biased in the direction to stop the disk cartridge 200 within the cartridge receiver 25A by an inverted S-shaped elastic lug 86b.

The cartridge lock releasing lever 85 is integrally formed with an elastically deformable torque transmission lug 87 having an inclined face 87a corresponding to the inclined part 52a of the lever pressing lug 52.

Rotation of the cartridge lock releasing lever 85 in the cartridge stop direction is restricted by a stopper 88 erectly disposed on the main plate 28 of the cartridge holder 25.

Figure 13:
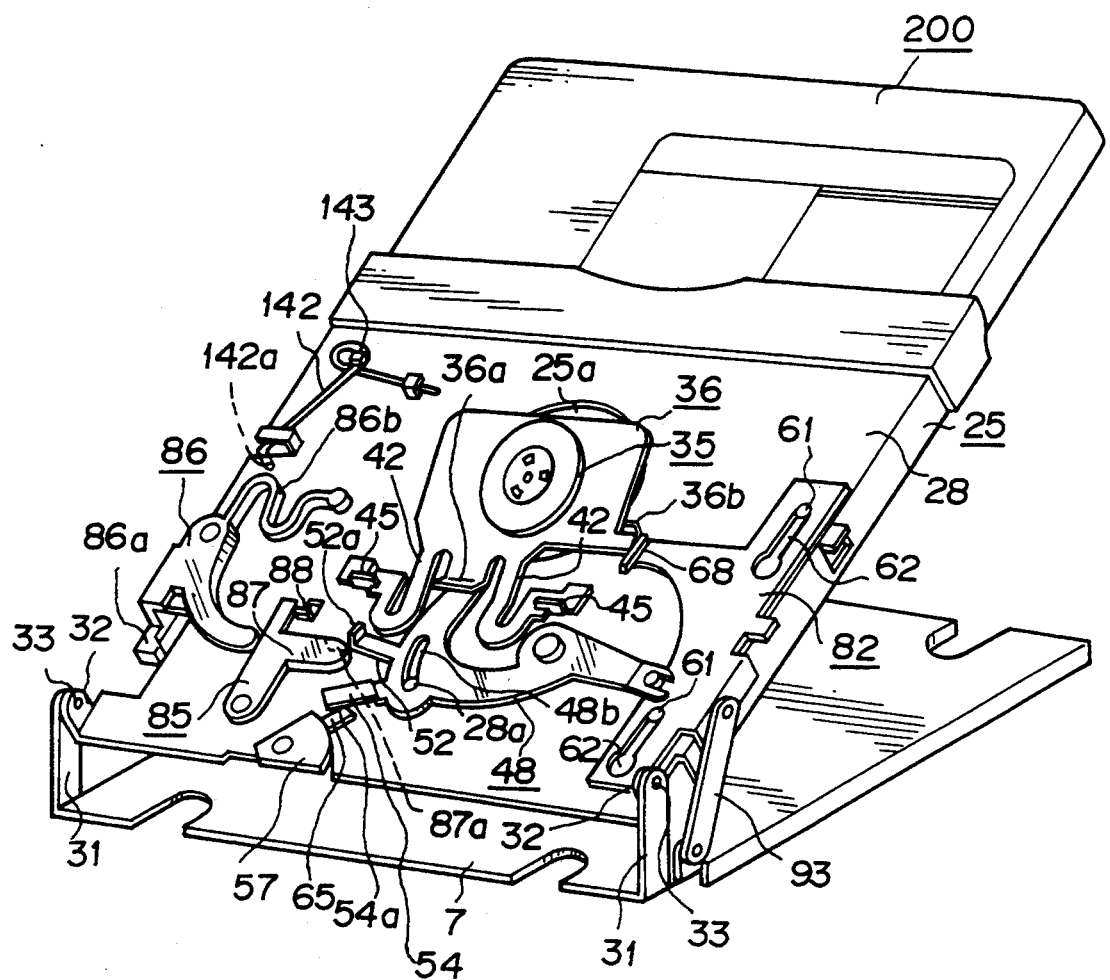
FIG. 13 is a view similar to FIG. 12, showing the cartridge holder and a chassis base plate with a connecting arm engaged with an arm pressing lug.
Figure 14:
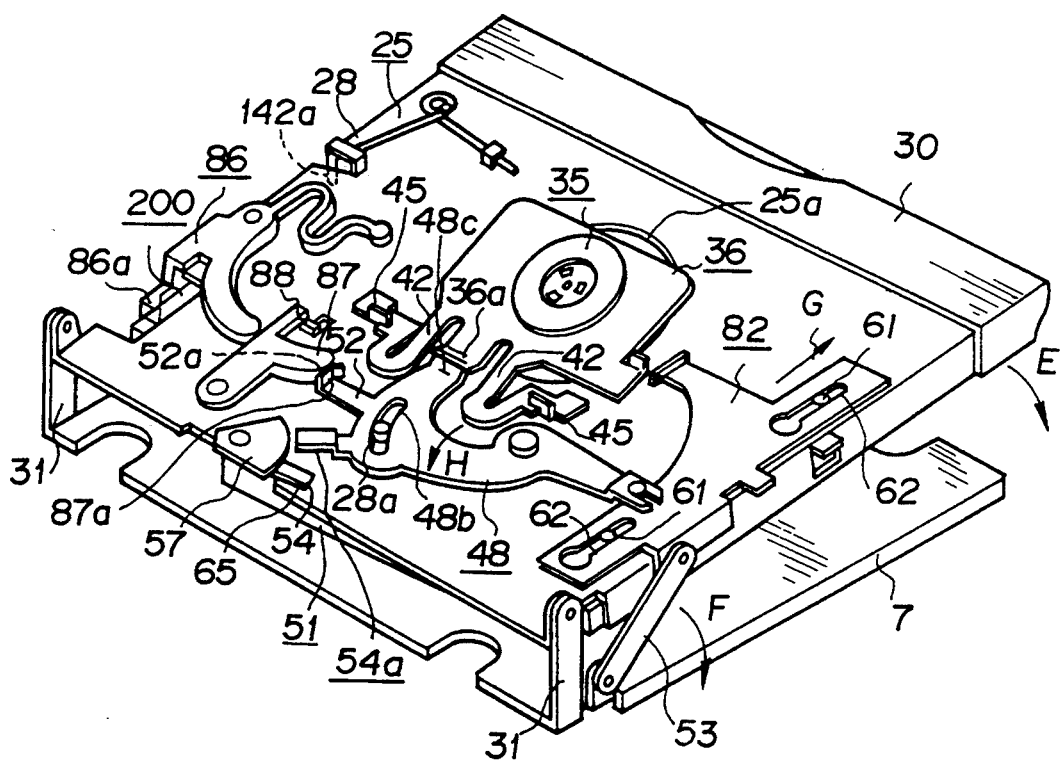
FIG. 14 is a view similar to FIG. 13, showing the cartridge holder and the chassis base plate with a torque transmission lug stranded on a lever pressing lug.
Figure 15:
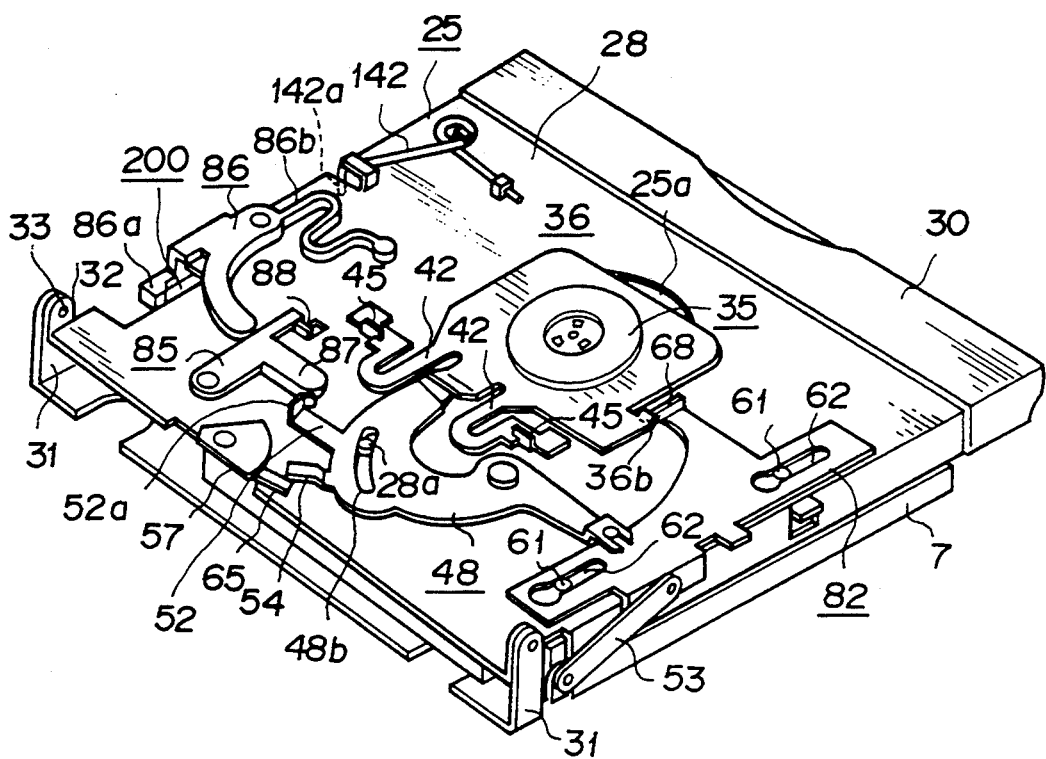
FIG. 15 is a view similar to FIG. 14, showing the cartridge holder and the chassis base plate with the torque transmission lug disengaged with the lever pressing lug.
Figure 16:
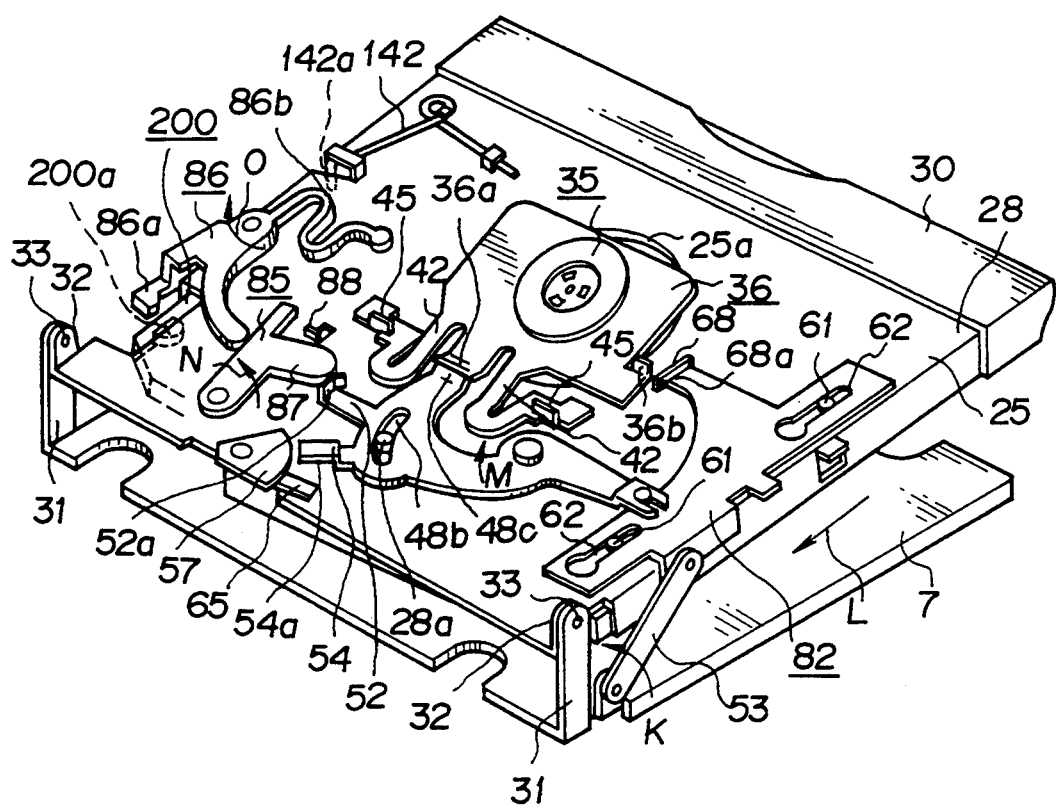
FIG. 16 is a view similar to FIG. 15, showing the cartridge holder and the chassis base plate with the torque transmission lug engaged with the lever pressing lug.

With the disk cartridge remover mechanism 84 having such a construction, when setting the disk cartridge 200 to the cartridge holder 25, the disk cartridge 200 is inserted in the cartridge holder 25 against a resilient force of the torsion spring 57 as shown in FIG. 13. Specifically, insertion of the disk cartridge 200 causes the cartridge stop lever 86 to rotate in the direction as indicated by arrow D in FIG. 7, and further insertion of the disk cartridge 200 causes the protrusion 86a of the cartridge stop lever 86 to locate in the recess 200a as shown in FIG. 8. At that time, since engagement of the connecting arm 65 of the shutter opening arm 51 with the pressing part 54a of the arm pressing lug 54 is released as shown in FIG. 14, the cartridge holder 25 is rotated by its own weight thereof in the direction as indicated by arrow E FIG. 14, and the connecting link 53 is swung in the direction as indicated by arrow F in FIG. 14, moving forward the slide plate 82 in its direction as indicated by arrow G in FIG. 14. In interlock with this forward movement, the clamper mounting plate rotating lever 48 is rotated in the direction as indicated by arrow H in FIG. 14, releasing stranded engagement of the engagement protrusion 48c with the lug 36a. When the clamper mounting plate rotating lever 48 is further rotated in the direction as indicated by arrow H in FIG. 14, the torque transmission lug 87 is elastically deformed by a pressing force of the lever pressing lug 52 so as to strand the inclined part 52a on the inclined face 87a. When the clamper mounting plate rotating lever 48 is further rotated in the same direction, engagement of the lever pressing lug 52 with the torque transmission lug 87 is released as shown in FIG. 15. Additionally, since the clamper mounting plate 36 is rotated in the direction as indicated by arrow I in FIG. 17, the disk clamper 35 is located in the cartridge holder 25, and attracted on the disk table 8 by an attractive force of the magnet 41, enabling unitary rotation of the optical disk 201 set on the disk table 8 with same.

Figure 17:
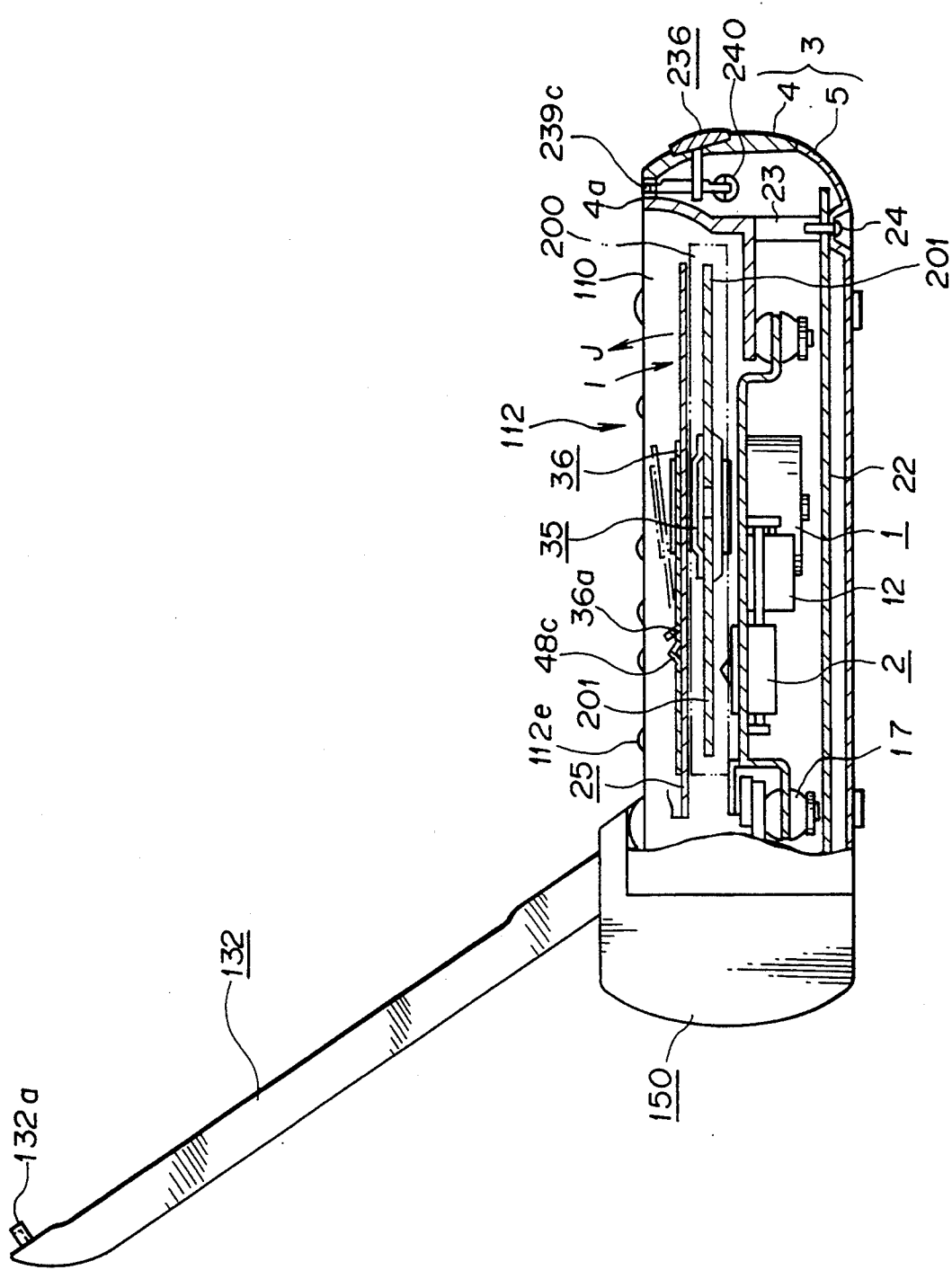
FIG. 17 is a view similar to FIG. 4, showing the disk player with the disk cartridge set in a disk loading part.
Figure 18:
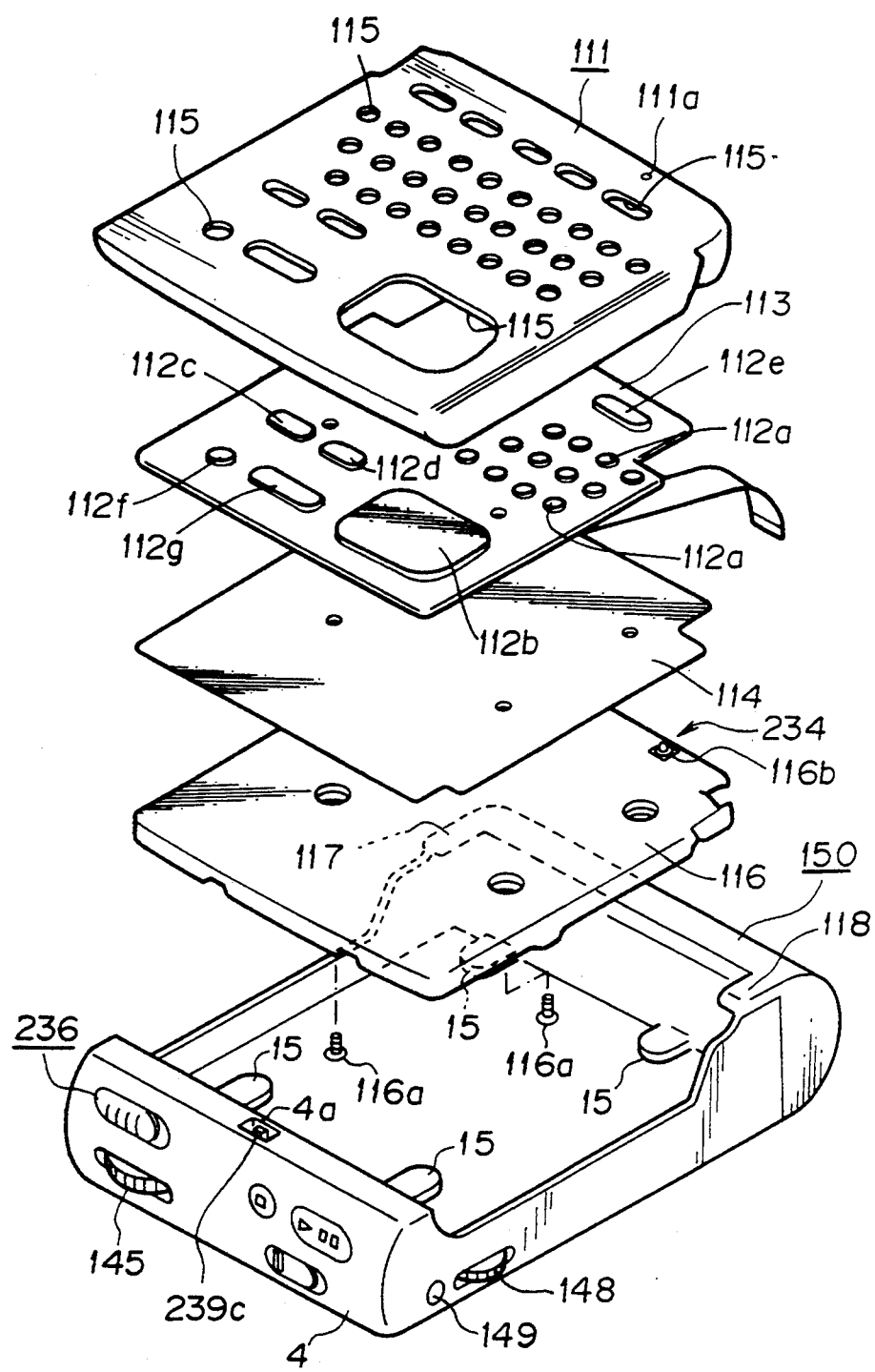
FIG. 18 is a view similar to FIG. 6, showing a keyboard cover.
Figure 19:
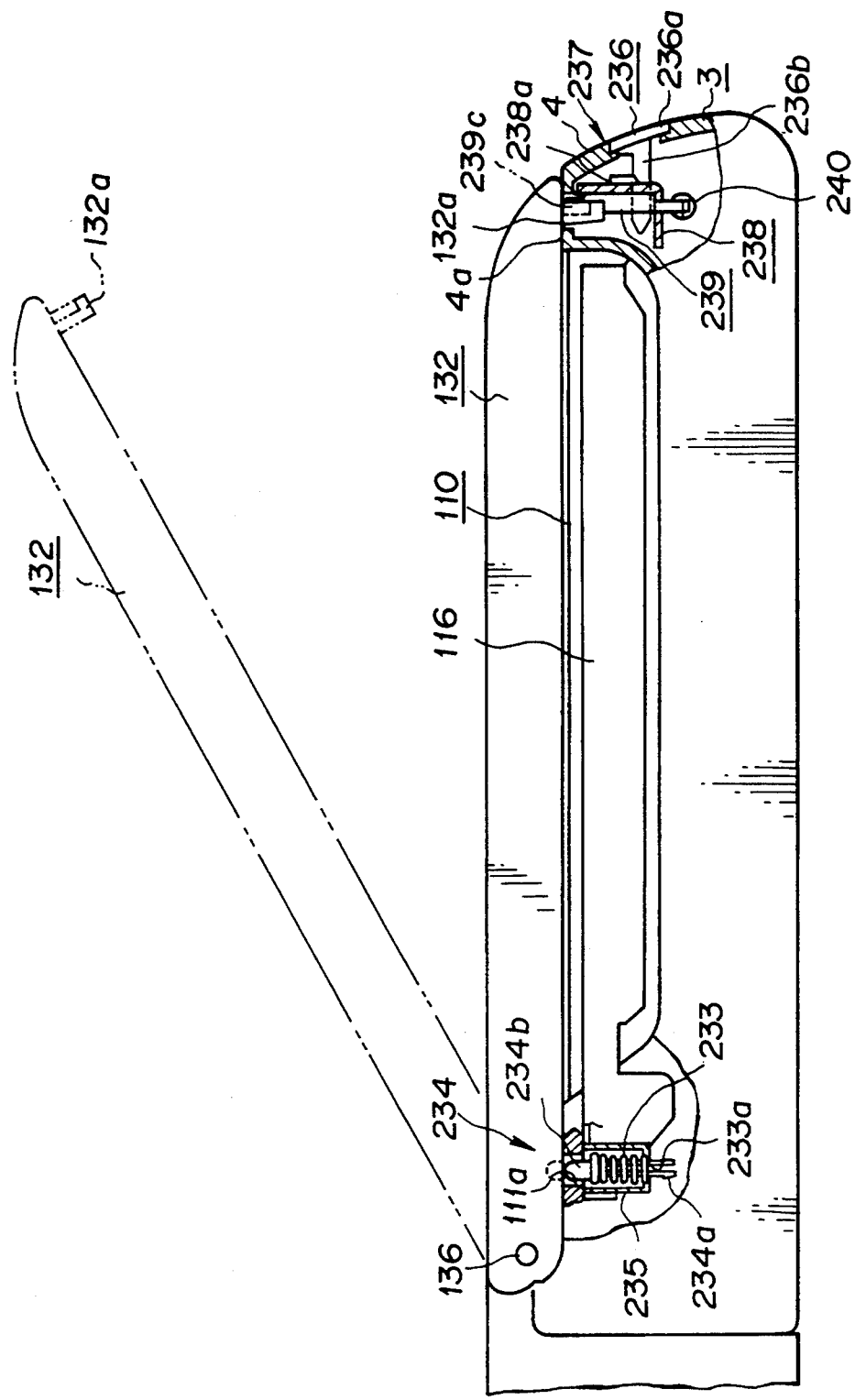
FIG. 19 is a partly sectional view showing a remover mechanism of a second cover.
Figure 20:
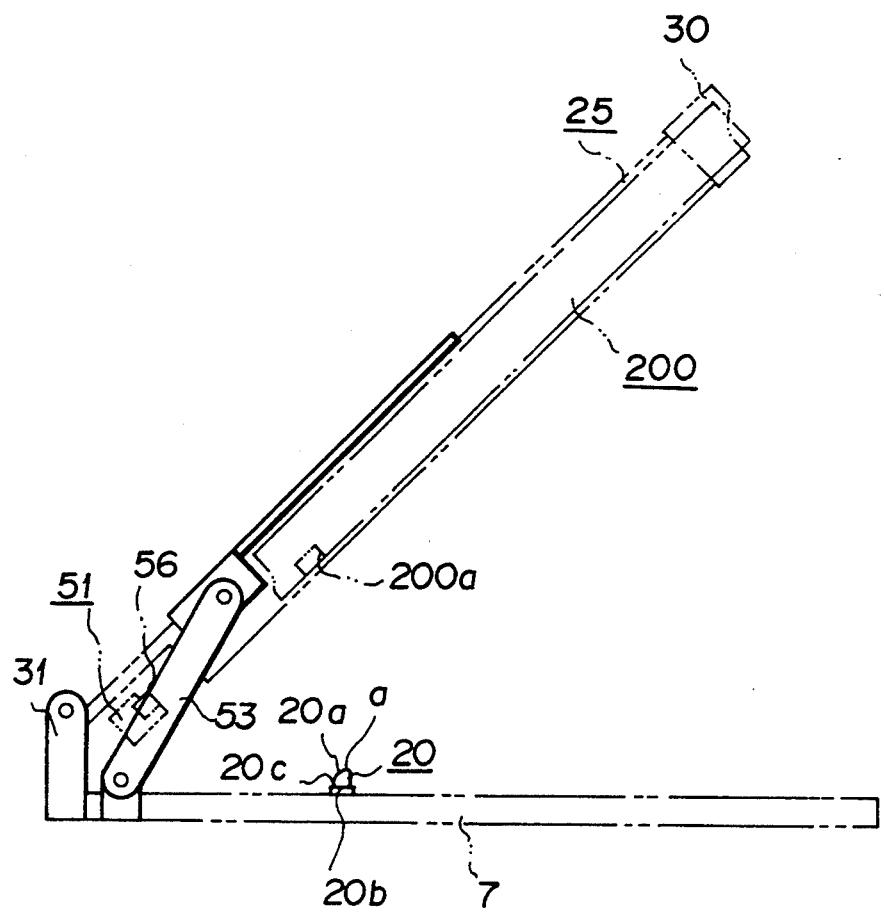
FIG. 20 is a side view showing the disk cartridge before its positioning.
Figure 21:
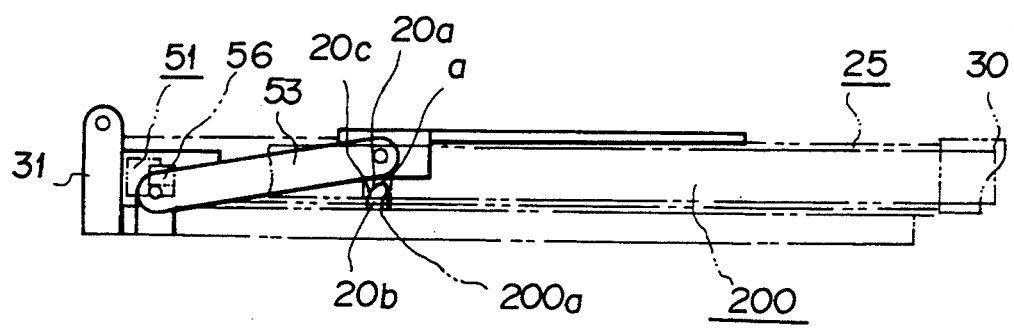
FIG. 21 is a view similar to FIG. 20, showing the disk cartridge after its positioning.

On the other hand, when removing the disk cartridge 200 from the cartridge holder 25 with the disk cartridge remover mechanism 84, the cartridge holder 25 is rotated in the direction as indicated by arrow J in FIG. 17 against an attractive force of the magnet 41. Specifically, rotation of the cartridge holder 25 causes the connecting link 53 to swing in the direction as indicated by arrow K in FIG. 16, moving backward the slide plate 82 in the direction as indicated by arrow L in FIG. 16. In interlock with this backward movement, the clamper mounting plate rotating lever 48 is rotated in the direction as indicated by arrow M in FIG. 16, obtaining stranded engagement of the lug 36a with the engagement protrusion 48c. When the clamper mounting plate rotating lever 48 is further rotated in the direction as indicated by arrow M in FIG. 16, not only the cartridge lock releasing lever 85 is rotated in the direction as indicated by arrow N in FIG. 16, but the cartridge stop lever 86 is rotated in the direction as indicated by arrow O in FIG. 16 by a pressing force of the lever pressing lug 52, disengaging the protrusion 86a of the cartridge stop lever 86 with the recess 200a. Thus, the disk cartridge 200 is moved in the direction as indicated by arrow P in FIG. 7 by a resilient force of the torsion spring 57A of the shutter opening arm 51.

In this embodiment, the disk cartridge remover mechanism 84 is so constructed that removal of the disk cartridge 200 can be carried out by drawing the cartridge in the direction as indicated by arrow Q in FIG. 8 against an engagement force provided by the protrusion 86a of the cartridge stop lever 86 against the recess 200a of the disk cartridge 200.

Further, in this embodiment, the disk cartridge remover mechanism 84 is so constructed that not only the aforementioned disk cartridge 200, but the optical disk can be loaded, and when disk cartridge 200 doesn't insert in the cartridge holder 25, in accordance with a rotation of cartridge holder 25, the shutter opening arm 51 can be moved in a position on the disk table 8 not to block rotation of the optical disk by the pressing force of pressing lug 54.

Referring next to FIGS. 3–4 and 19–22, a positioning mechanism of a first cover will be described.

The first cover as a panel, designated by reference numeral 110, comprises the aforementioned cartridge holder 25, and a keyboard cover 111 with a through hole 111a. The keyboard cover 111 includes on the counter cartridge holder side thereof a function part having a plurality of function keys 112 for controlling a readout of information signal of the optical disk set in the disk loading part 6, and reading out and regenerating a desired information from the optical disk.

The function part comprises a function key plate 113 having the plurality of function keys 112 elastically displaceable by pressing operation as integrally formed on a piece of elastic board, and a key switch mounting plate 114 having a printed board on which a switch part is formed for turn on and off by pressing operation of the function keys 112. The function key plate 113 is disposed inside the keyboard cover 111, and each function key 112 is fitted in a corresponding through hole 115 of the keyboard cover 111. The key switch mounting plate 114 is disposed inside the keyboard cover 111 in a manner to lap over the function key plate 113. The function key plate 113 and the key switch mounting plate 114 are fixed to the keyboard cover 111 on the inner part thereof by a cover plate 116. The cover plate 116 is fixed to the keyboard cover 111 by screws 116a, and has a rear edge formed with a square hole 116b having an opening on the two sides thereof.

Disposed at a periphery of the opening of the square hole 116b is a holding lug 233 with an U-shaped section, which is located on the lower side of the cover plate 116, and has a through hole 233a corresponding to the through hole 111a. Additionally, the holding lug 233 movably provides a pressing member 234 made of hard material and having a stop lug 234a fitted in the through hole 283a and a protrusion 234b with a flange fitted in the through hole 111a.

The pressing member 234 is biased by a compression coil spring 235 in the direction that a second cover 132 which will be described hereinafter is detached from the keyboard cover 111. The compression coil spring 235 is disposed around the stop lug 234a, and interposed between an end face of the flange of the protrusion 234b and the periphery of the opening of the through hole 233a.

It is to be noted that the length of the protrusion 234b can be reduced by locating the pressing member 234 nearer to a supporting position of the second cover 132.

The function keys 112 constituting the function part comprises an alphabet key 112a for indicating the alphabet, a cursor displacing key 112b for displacing a cursor for indexing a plurality of selected information items to be read out from the optical disk 201 and displayed on a display part which will be described hereinafter, and making the cursor index a desired information item, a plurality of selection keys 112c, 112d for selecting a selected information item indexed by displacement of the cursor due to operation of the cursor displacing key 112b, a plurality of function selection keys 112e for selecting a information readout function of the disk player, and a plurality of character indication changeover keys 112f, 112g.

The keyboard cover, 111 having the function part arranged in such a manner is rotatable relative to the disk player main body 3 by supporting around support shafts 123 rotation support plates 122 to support plates 119 which is disposed on opposed inner sides of cover mounting parts 117, 118 erectly disposed to the cabinet 4 at both rear end sides thereof. The keyboard cover 111 has a toggle spring 125 between the one support plate 119 and the one rotation support plate 122 so as to ensure a cover closing position and a cover opening position relative to the disk player main body 3.

Figure 22:
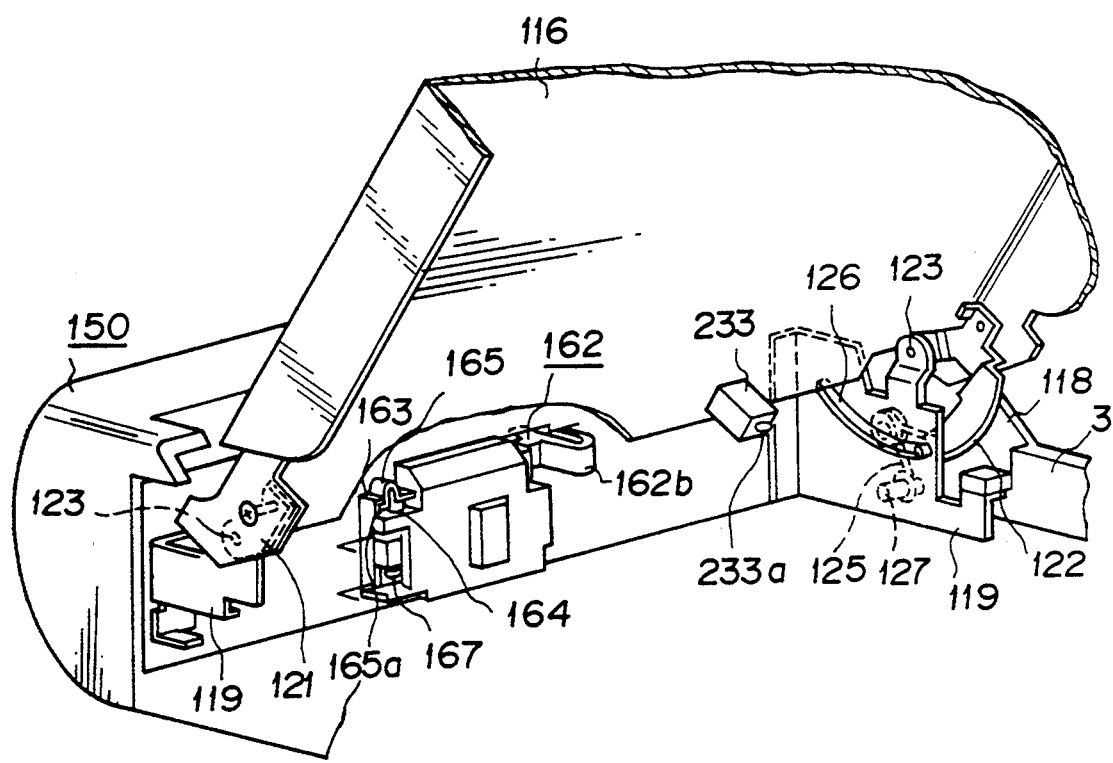
FIG. 22 is a view similar to FIG. 16, showing a cover plate and a battery casing in connection with a mounting state of the first cover relative to a disk player main body.
Figure 23:
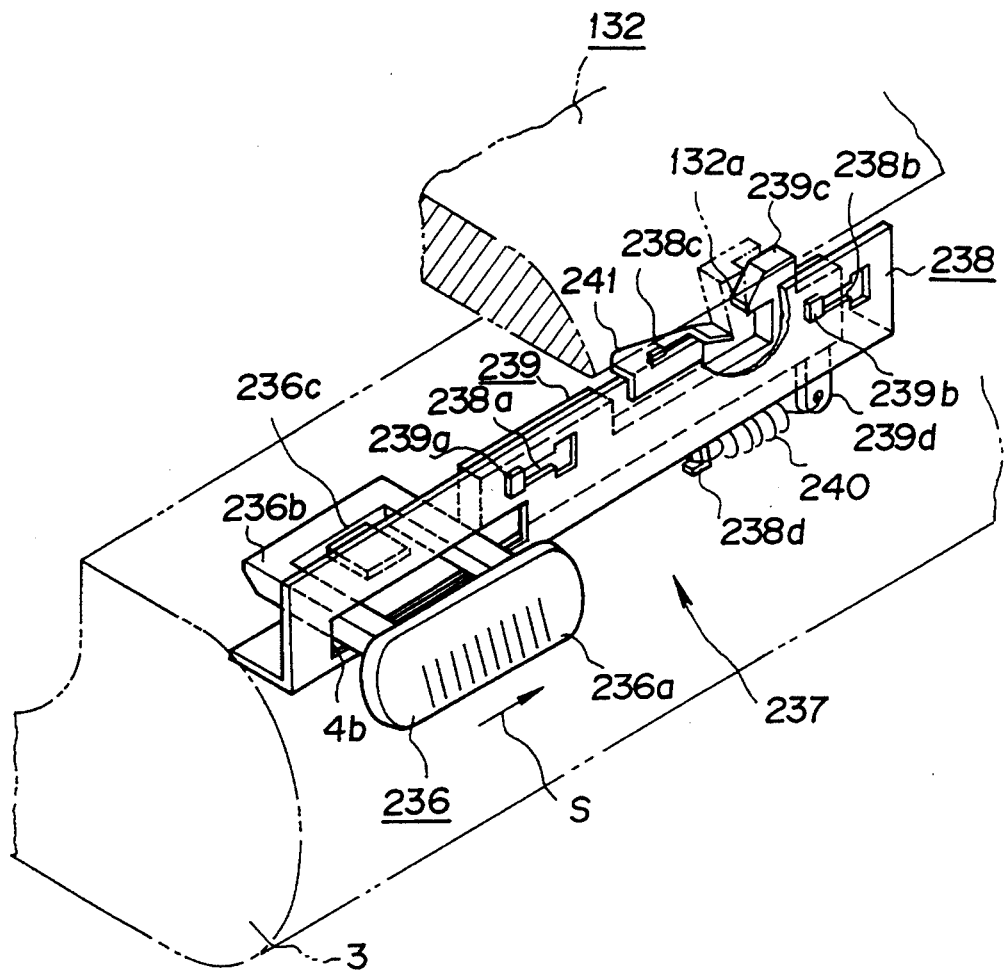
FIG. 23 is a view similar to FIG. 22, showing a lock mechanism of the second cover relative to the disk player main body.

As best seen in FIG. 22, the toggle spring 125 has one arm with a point engaged with engagement holes 126 (only one of which is shown in FIG. 22) formed in the rotation support plate 122 and the support plate 119 on the side of the keyboard cover 111, and the other arm with a point engaged with an engagement pin 127 protuberantly arranged to the support plate 119.

The cartridge holder 25 is connected to the keyboard cover 111 as follows: Upon connection of the cartridge holder 25 to the keyboard cover 111, engaged lugs 128 as arranged on both sides of the main plane 28 of the cartridge holder 25 are engaged with engagement lugs 130 as arranged on opposed inner sides of the keyboard cover 111.

When the first cover 110 is closed, the engaged lugs 128 and the engagement lugs 130 are engaged with each other to rotate the cartridge holder 25 with the keyboard cover 111.

Accordingly, when the first cover 110 is rotated in the direction to close the disk loading part 6 of the disk player main body 3, the cartridge holder 25 is also rotated in the direction to close the disk loading part 6. When the cartridge holder 25 is rotated up to a down position to close the disk loading part 6, the disk table 8 gets in the cartridge main body 202 from the disk table insertion opening 206 as opened so that the optical disk 201 in the cartridge main body 202 is set on the disk table 8. At that time, the center hole of the optical disk 201 is engaged with the centering member 11 to carry out centering relative to the disk table 8. The disk cartridge 200 is horizontally and vertically positioned by the positioning guide pins 20 and the height positioning pins 21 in the disk loading part 6.

Each positioning guide pin 20 comprises two small and large protrusions having a guide insertion part 20a fitted in the positioning recess 200a of the disk cartridge 200 by rotation of the cartridge holder 25, and a cylindrical positioning base end part 20b, which are disposed at the rear end of the chassis base plate 7 at a predetermined interval in the cross direction thereof. The guide insertion part 20a of the positioning guide pin 20 is tapered off by forming a cutout 20c for slipping the opening edge of the positioning recess 200a upon rotation of the cartridge holder 25, and has a top "a" located on the counter support side of the cartridge holder 25.

Some disk player merely use an optical disk as a recording medium. In that case, the cartridge holder 25 is not necessary to dispose, and the disk clamper 35 for holding the optical disk in cooperation with the disk table 8 is mounted to the keyboard cover 111 directly.

Figure 24:
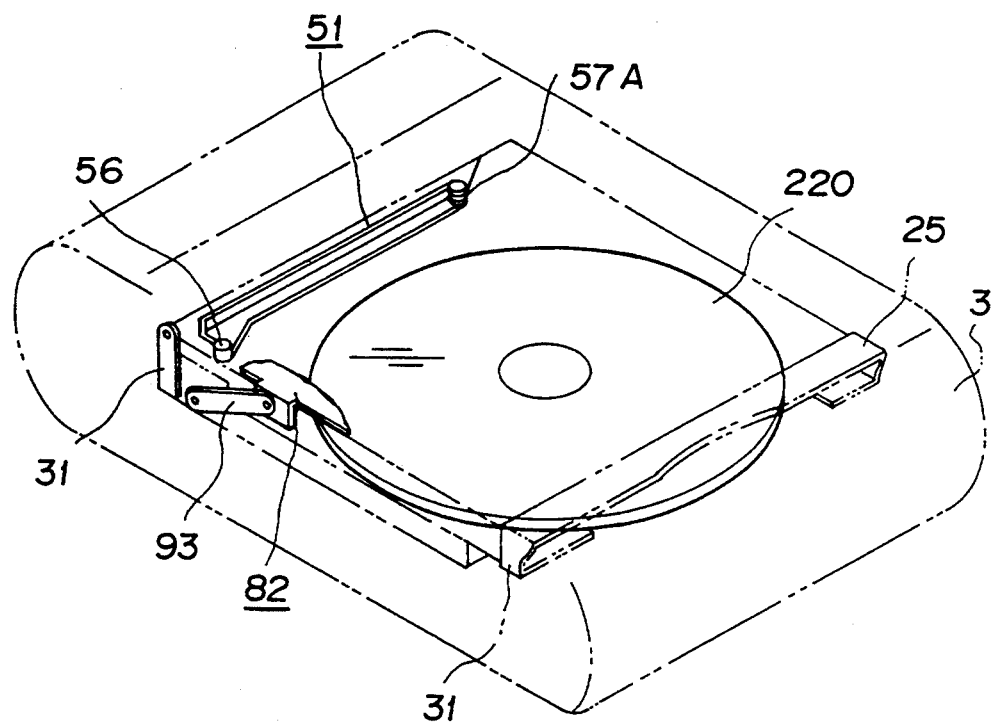
FIG. 24 is a view similar to FIG. 23, showing the disk player with an optical disk set in the disk loading part.

Referring to FIG. 24, the optical disk 220 not housed in the disk cartridge 200 is set in the disk loading part 6 as follows: In the open state of the disk loading part 6 obtained when the first cover 110 is opened, the optical disk 220 is set on the disk table 8, and the first cover 110 is rotated in the direction to close the disk loading part 6 of the disk player main body 3.

Referring next to FIGS. 3–4, 19, 23, and 25, a remover mechanism for the second cover will be described.

The second cover, designated by reference numeral 132, has a function of a display panel for displaying as image information as read out and regenerated from the optical disk, and includes a display part 133 on the inside thereof. The display part 133 comprises a display panel 134 having, for example, liquid crystal elements. The second cover 132 has friction pins 136 at the upper end of opposed inner sides of cover mounting parts 117, 118 supported by bearings (not shown). Additionally, the second cover 132 has in the center on the free end side thereof a lock click 132a to be engaged with the disk player main body 3, and at the end on the support side thereof a contact part 132b corresponding to the protrusion 234b of the pressing member 234.

Disposed to the disk player on one side thereof are a sound signal output jack 146, an external power input jack 147, whereas disposed thereto on the other side thereof is an image signal output jack 149 and a contrast adjusting knob 148 of the display panel 134.

Disposed within the disk player main body 3 at the front thereof are a lock releasing pressing member 236 which is located in a through hole 4b and moved in the cross direction thereof, and a lock mechanism 237 which is operated by the lock releasing pressing member 236.

The lock mechanism 237 comprises an L-shaped mount 238 fixed to the disk player main body 3, and having two guide holes 238a, 238b parallelly disposed in the cross direction thereof at a predetermined interval and two stop lugs 238c, 238d protruding in the vertical direction thereof, a slider 239 movably mounted to the mount 238, and having protrusions 239a, 239b located in predetermined guide holes 238a, 238b and stop lugs 239c, 239d protruding in the vertical direction, and an extension coil spring 240 interposed between the stop lug 239d of the slider 239 and the stop lug 238d of the mount 238 for providing a return behavior to the lock releasing pressing member 236. Disposed to the mount 238 of the lock mechanism 237 is an elastic lug 241 for biasing the lock click 132a of the second cover 132 to the stop lug 239c in a lock state thereof. The lock releasing pressing member 236 comprises an operation lug 236a exposed outside, an U-shaped holding lug 236b protruding rearward of the operation lug 236a, and an engagement lug 236c protruding forward of the holding lug 236b and engaged with the disk player main body 3 on the back thereof.

Accordingly, removal of the second cover 132 from the disk player main body 3 can be carried out by moving the lock releasing pressing member 236. Specifically, if the lock releasing pressing member 236 is moved in the direction as indicated by arrow S in FIG. 23 against a resilient force of the extension coil spring 240, the slider 239 is moved in the same direction to release engagement of the lock click 132a with the stop lug 239c, and the pressing member 234 is moved upward by a resilient force of the compression coil spring 235 to press the second cover 132 in the direction to separate from the first cover 110.

A volume controller 145 for control a sound volume is disposed to the disk player main body 3 on the side thereof.

Figure 25:
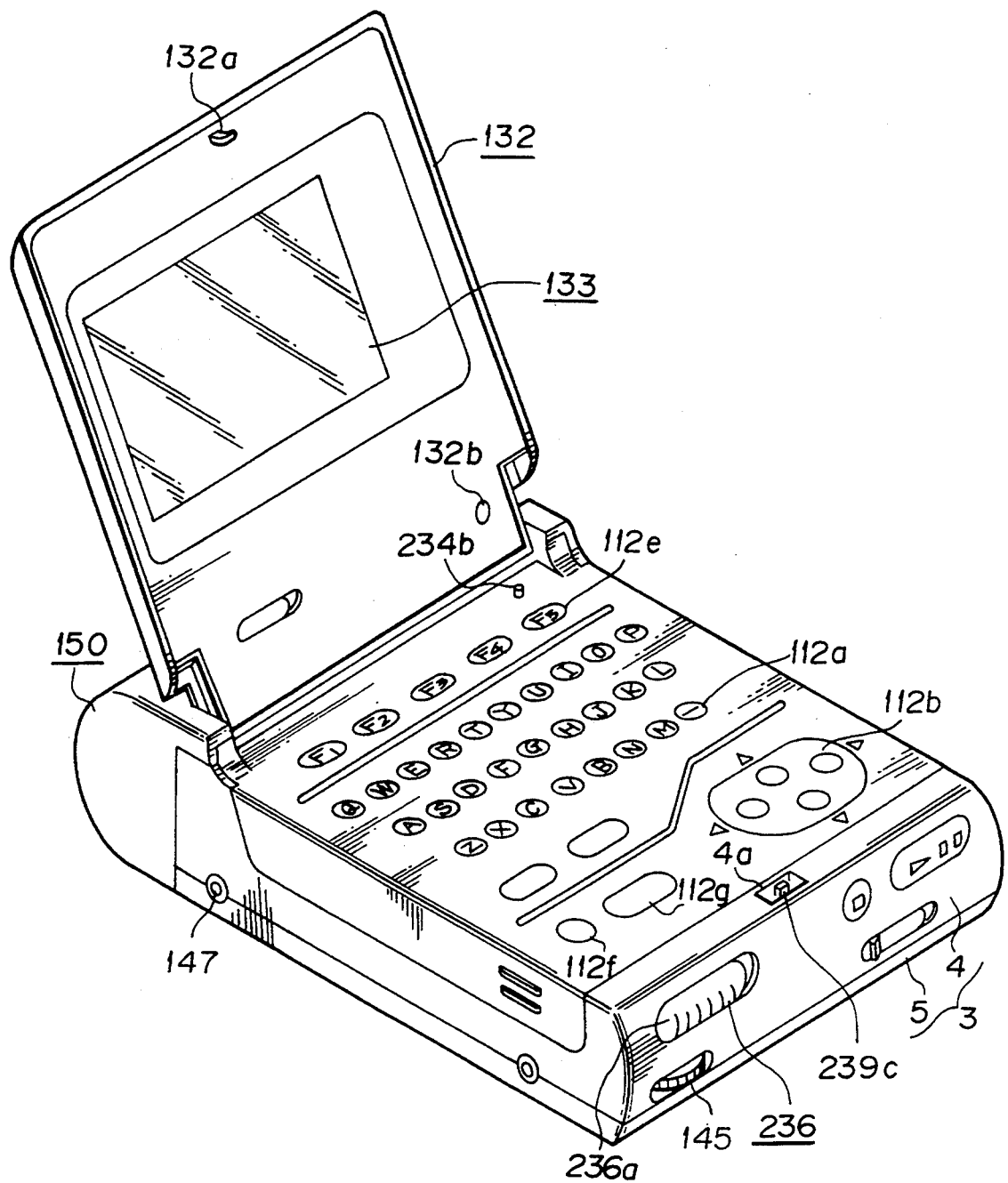
FIG. 25 is a view similar to FIG. 26, showing the disk player in use.

Referring next to FIGS. 17 and 25, a readout and regeneration state of information signal will be described.

In a state that the disk cartridge 200 or the optical disk 220 is set in the disk loading part 6, the first cover 110 conceals the disk loading part 6, i.e., it assumes a closed state relative to the disk player main body 3. Thus, the keyboard 113 is on the upper side of the first cover 110 to be exposed outside. At that time, the second cover 132 is rotated to adequately set the angle thereof.

Then, a start button is operated to start drive of the optical disk 201 so as to read out and regenerate information signal recorded on the optical disk 201, whereas a key switch of the function key 112 is operated to read out the a desired information. Thus, the desired information read out and regenerated from the optical disk 201 is displayed on the display part 133 of the second cover 132 as image information.

When ejecting the disk cartridge 200 from the disk player main body 3 after completion of readout and regeneration of the desired information, the stop button is operated to stop the disk player, then the first cover 110 is rotated in the open direction. With rotation of the first cover 110 in the open direction, the cartridge holder 25 is also rotated in the same direction to reach an up position relative to the disk player main body 3. Thus, when using the disk cartridge 200, the disk cartridge 200 within the cartridge holder 25 is moved in the disk drawing direction by the shutter opening arm 51, having a part thereof exposed outside the cartridge holder 25. When using the optical disk 220, it is manually drawn outside the disk player main body 3.

Mounted to the cartridge holder 25 is an anti insertion error member 142 comprising a torsion coil spring for preventing an insertion error of the disk cartridge 200, and preventing a quick discharge of the disk cartridge 200 from the cartridge holder 25 upon ejection by pressing the disk cartridge 200 at one end face thereof inserted in the cartridge holder 25. The anti insertion error member 142 is disposed via a mounting lug 143 formed to stand on the main plane 28 of the cartridge holder 25 at one end part thereof. Thus, if the disk cartridge 200 is inserted in the cartridge holder 25 in the wrong direction, a part of the disk cartridge 200 is caught by an anti insertion error part 142a, preventing insertion of the disk cartridge 200 in the cartridge holder 25 in a predetermined position thereof. On the other hand, when ejecting the disk cartridge 200, the anti insertion error part 142a presses the cartridge main body 202 on one side thereof, preventing a quick discharge of the disk cartridge 200 from the cartridge holder 25.

Figure 5:
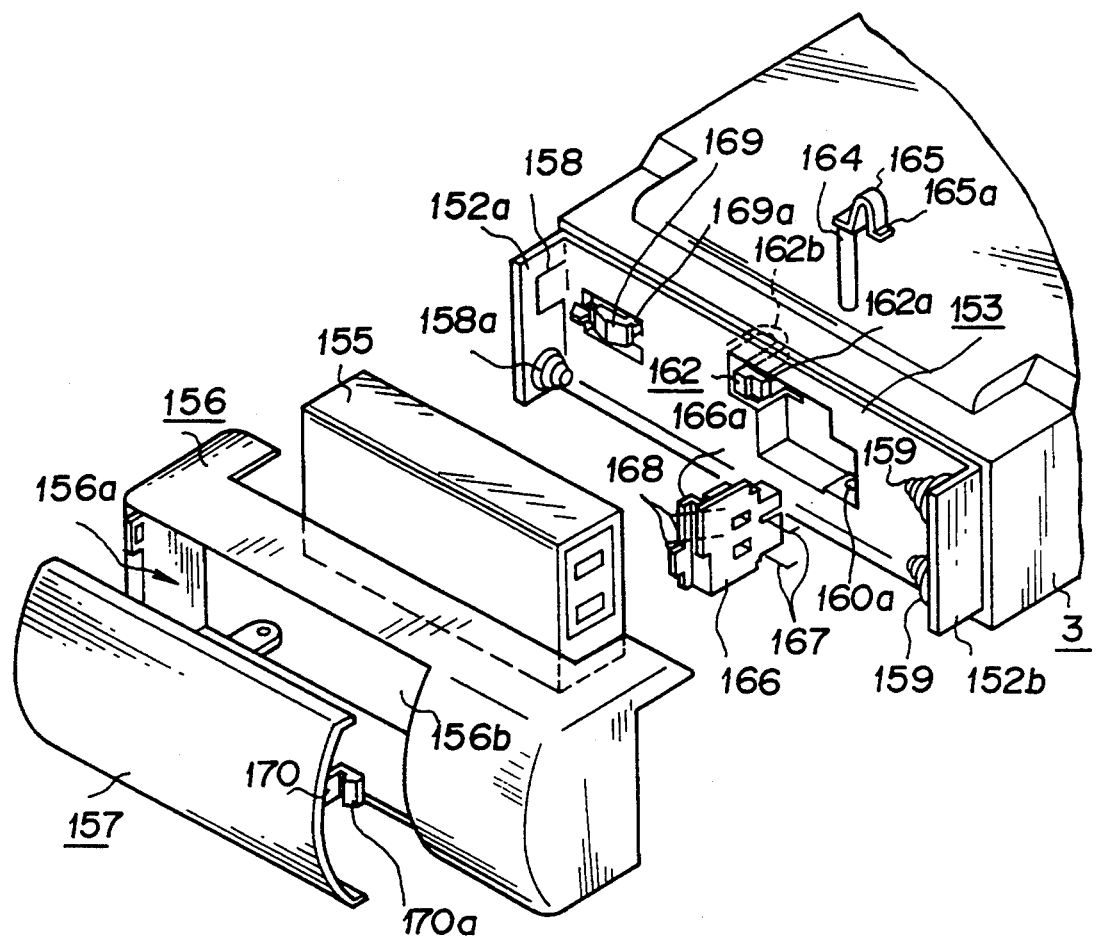
FIG. 5 is a view similar to FIG. 2, showing a battery casing.
Figure 6:
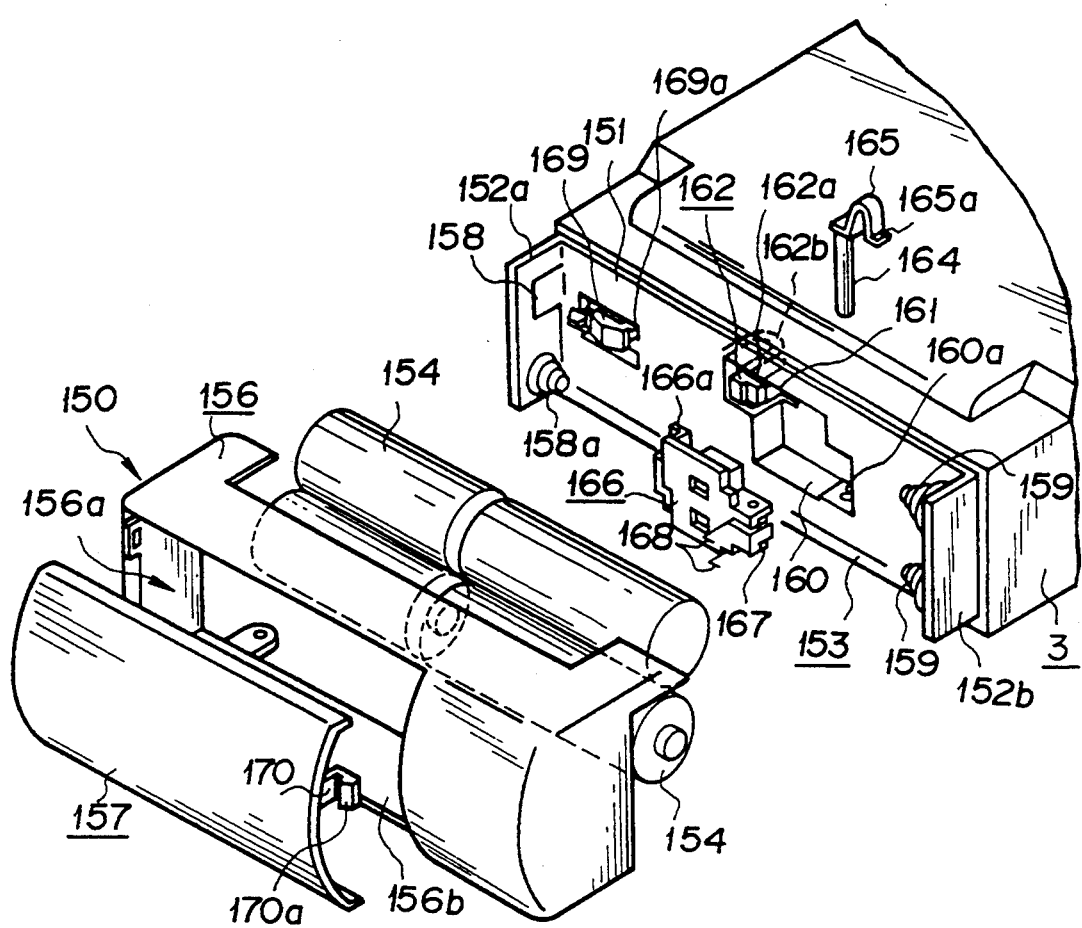
FIG. 6 is a view similar to FIG. 5, showing the battery casing with batteries.
Figure 7:
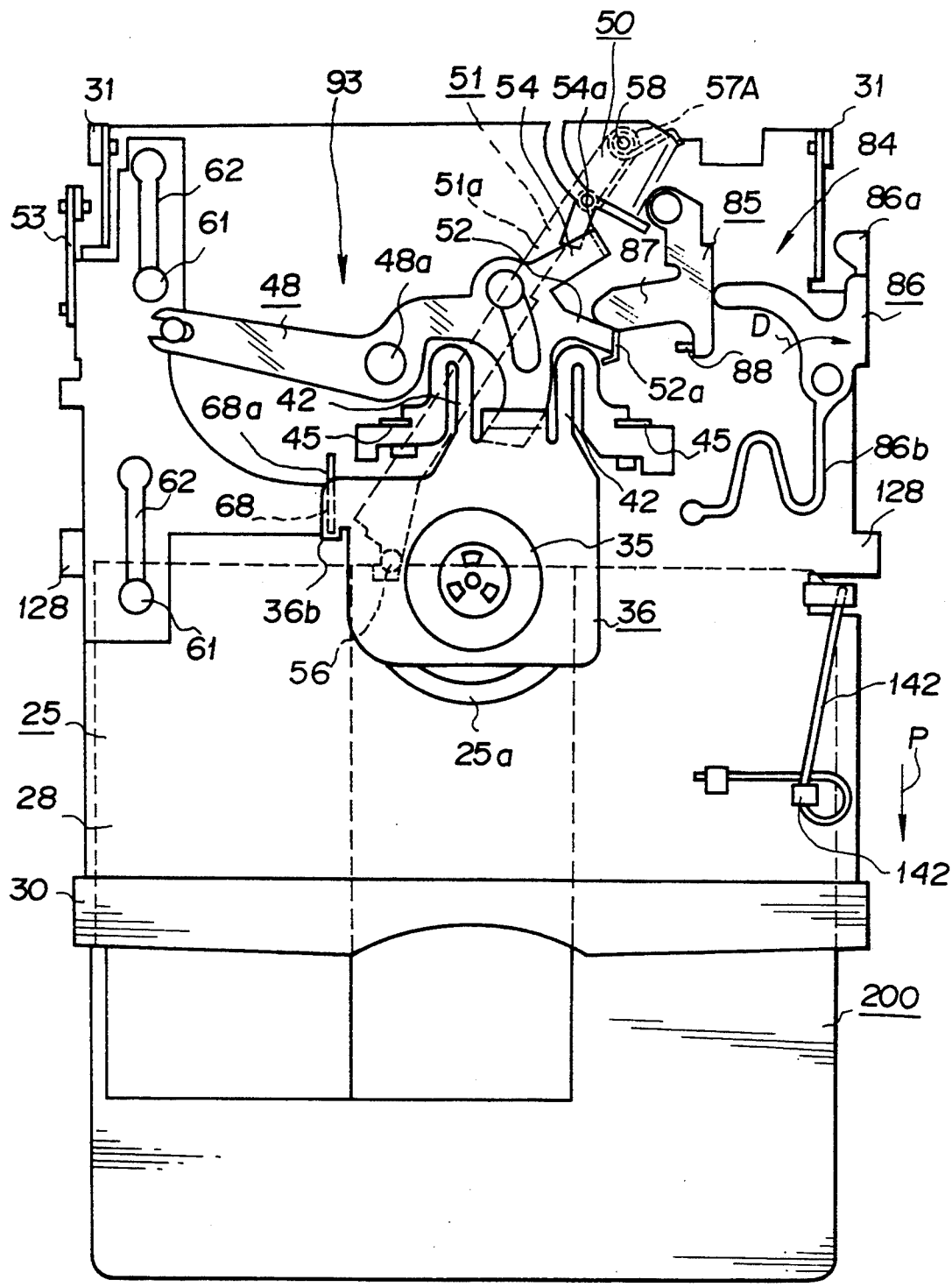
FIG. 7 is a plan view showing a cartridge holder before loading a disk cartridge.

Referring next to FIGS. 5 and 6, a battery casing will be described.

The battery casing, designated by reference numeral 150, comprises an U-shaped mounting plate 153 having a base part 151 as a switching plate setting part fixed to the disk player main body on the back thereof and two side parts 152a, 152b disposed to the base part 151 to be opposite each other, a box 156 set to the mounting plate 153 and having a space 156a capable of selectively receiving dry batteries 154, 155 and a battery insertion hole 156b which opens inside and outside the space 156a, and a cover 157 detachably mounted to the box 156 for closing the battery insertion opening 156b.

Mounted to the mounting plate 153 at one side 152a thereof is a battery connecting terminal 158 having a spring 158a for pressing the battery, whereas mounted thereto at the other side 152b thereof is a spring 159 for pressing the battery. The base part 151 of the mounting plate 153 is formed with a receiving recess 160 which has a shaft hole 160a to open vertically and opens into the space 156a, and a through window 161 which communicates with the receiving recess 160 and the space 156a. Additionally, the base part 151 has a front part integrally formed with via an elastic support lug 162b a pressing member 162 located in the receiving recess 160 and having a click 162a for lock release, and with a hook-shaped stopper 163 to laterally be in parallel with the pressing member 162. A support shaft 164 is disposed in the vicinity of the stopper 163 to fit in the shaft hole 160a. An elastic lug 165 having a click 165a corresponding to the stopper 163 is integrally formed with the support shaft 164.

A switching plate 166 is rotatably mounted via the support shaft 164 to the base part 151 of the mounting plate 153 at the rear part thereof to be located in each predetermined position in the receiving recess 160 of the space 156a.

The switching plate 166 is biased by a spring 167 in the direction of the space 156a. The switching plate 166 has a back of a counter support side upper edge integrally formed with a click 166a engaged with the click 162a of the pressing member 162, and a back of a center part to which two terminals 168 connecting a battery charger 155 are mounted at a predetermined interval in the vertical direction.

A switch pressing lug 169 is integrally formed with the mounting plate 153 in the vicinity of the battery terminal part thereof via an elastic support lug 169a.

Integrally formed with the cover 157 of the battery casing 150 is a stop lug 170 having a click 170a engageable with a protrusion (not shown) which is erectly disposed at the periphery of the opening of the battery insertion hole 156b.

Accordingly, When loading the battery 154 in the battery casing 150, the switching plate 166 is received in the receiving recess 160, whereas when loading the battery 155, the switching plate 166 is rotated to stand in the space 156a. In that case, by pressing the pressing member 162 against a resilient force of the elastic support lug 162b, engagement of the click 162a with the click 166a is released, and the switching plate 166 is rotated by a resilient force of the spring 167 to stop in a standing state in a predetermined position of the space 156a. On the other hand, by pressing the switching plate 166 against a resilient force of the spring 167, the switching plate 166 is rotated so that the click 166a gets over the click 162a, obtaining engagement of the click 166a with the click 162a. Thus, the switching plate 166. is received in the receiving recess 160, and stops therein.

Figure 26:
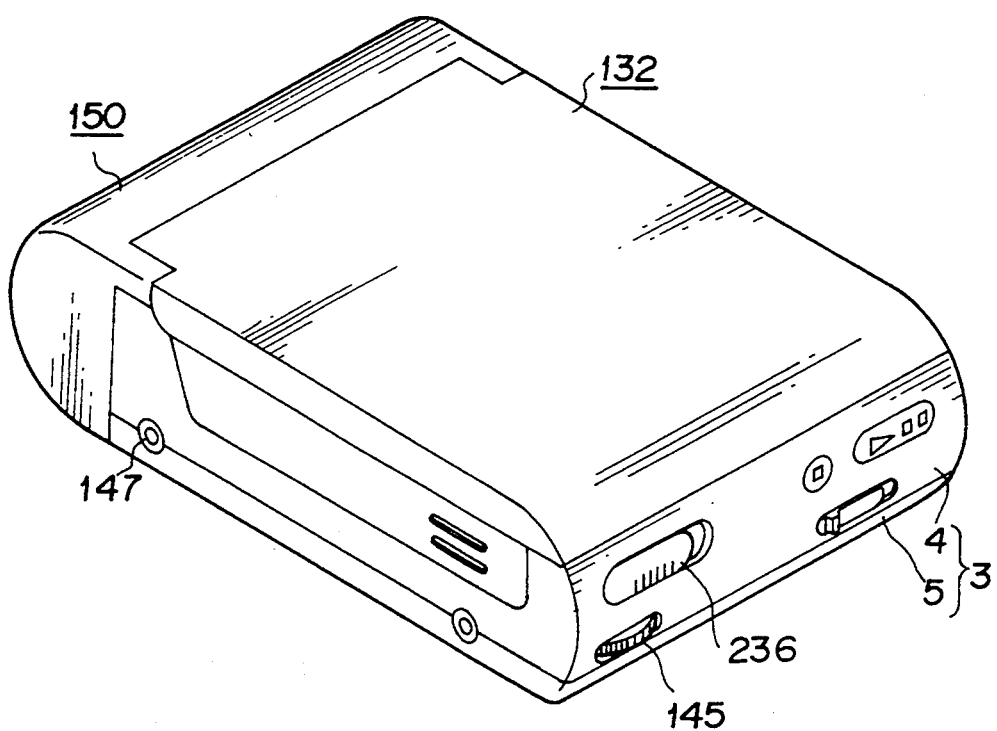
FIG. 26 is a view similar to FIG. 25, showing the first and second covers integrated with the disk player man body.

When the disk player embodying the present invention is in keeping or not used, the first cover 110 is rotated to close the disk loading part 6 on the upper side of the disk player main body 3, and the second cover 132 is rotated on the side of the disk player main body 3 to place on and close the first cover 110. Thus, referring to FIG. 26, the function keys 112 are concealed by the second cover 132, and integrated with the disk player main body 3.

In the present invention, the disk player can be driven by direct current power of 9 V via the jack 147 for external power input in place of the battery or battery charger.

As described above, according to the present invention, there is provided a cartridge holder having a cartridge receiver for loading a disk cartridge, and a shutter opening arm disposed to the cartridge holder and rotatable by loading/removing of the disk cartridge. Also provided is a first lever rotatably mounted to the cartridge holder so as to provide to the shutter opening arm a torque in the shutter opening direction, a second lever rotatable by a torque of the first lever in the shutter closing direction, and a cartridge stop lug rotatably disposed to undergo a pressing force in the cartridge removing direction by rotation of the second lever. This cartridge stop lug is biased in the direction to stop the disk cartridge within the cartridge receiver. Thus, engagement of the cartridge stop lug with the disk cartridge can be released independently.

Accordingly, upon insertion error of the disk cartridge, it is not necessary to remove the disk cartridge by providing rotation to the cartridge holder as in the prior art, resulting in easy reset operations of the cartridge with a reduced number of reset operations thereof.

Further, according to the present invention, there is provided a holder having an opening window for inserting a clamper in a position corresponding to a table for setting the disk, and a clamper mounting plate mounted to the holder for holding the disk clamper. The clamper mounting plate is made of a sheet elastically deformable and having a biasing force in the direction to locate the disk clamper in the opening window, enabling the clamper to move in the opening window by elastic deformation of the clamper mounting plate.

Accordingly, a support shaft and a spring which were indispensable for mounting of the disk clamper to the holder become unnecessary, resulting in a cost down, and simplified structure and assembly work, with a reduced number of parts.

What is claimed is:

1. A system for loading a disk, comprising:
   a chassis having a disk loading part for loading the disk and a drive for driving the disk, said disk loading part having a disk table;
   a holder attached to said chassis, said holder being movable between an open position to open said disk loading part and a closed position to close said disk loading part;
   a disk clamp means, mounted on said holder and opposed to said disk table, for clamping the disk in cooperation with said disk table when said holder is in the closed position, wherein said disk clamp means includes a disk clamper for holding the disk in cooperation with said disk table, and a clamper mounting plate for supporting said disk clamper, said clamper mounting plate including an integrally formed means for biasing said disk clamper toward said disk table; and
   a disk clamp releasing means for releasing said clamping of the disk by said disk clamp means in accordance with a movement of said holder from said closed position to said open position.

2. A system for loading a disk, comprising:
   a chassis having a disk loading part for loading the disk and a drive for driving the disk, said disk loading part having a disk table;
   a holder attached to said chassis, said holder being movable between an open position to open said disk loading part and a closed position to close said disk loading part;
   a disk clamp means, mounted on said holder and opposed to said disk table, for clamping the disk in cooperation with said disk table when said holder is in the closed position, wherein said disk clamp means includes a disk clamper for holding the disk in cooperation with said disk table, and a clamper mounting plate for supporting said disk clamper, said clamper mounting plate including a pair of elastic supports biasing said disk clamper toward said disk table; and
   a disk clamp releasing means for releasing said clamping of the disk by said disk clamp means in accordance with a movement of said holder from said closed position to said open position.

3. A system as claimed in claim 2, wherein said clamper mounting plate is elastically displaceable.

4. A system for loading a disk of claim 2, wherein: the pair of elastic supports are U-shaped.

5. A system for loading a disk of claim 2, wherein: the disk clamp releasing means is at least partially positioned between the pair of elastic supports.

6. A system for loading a disk of claim 2, wherein: the pair of elastic supports are integrally formed with the clamper mounting plate.

7. A system for loading a disk comprising:
   a chassis having a disk loading part for loading the disk and a drive for driving the disk, said disk loading part having a disk table;
   a holder attached to said chassis, said holder being movable between an open position to open said disk loading part and a closed position to close said disk loading part;
   a disk clamp means, opposed to said disk table, for clamping the disk to the disk table when the holder is in the closed position;
   a disk clamp releasing means for releasing said clamping of the disk by said disk clamp means when said holder moves from said closed position to said open position;
   a shutter opening means for opening a shutter of a disk cartridge, the shutter opening means being movable between an ejecting position and a receiving position;
   wherein said disk clamp means includes a disk clamper for holding the disk in cooperation with said disk table, and a clamper mounting plate for supporting said disk clamper, said clamper mounting plate always biasing said disk clamper to said disk table, the disk clamp means including a rotating lever engaging the shutter opening means for moving the shutter opening means between the ejecting and receiving positions; and
   wherein said clamper mounting plate is elastically displaceable.

* * * * *

UNITED STATES PATENT AND TRADEMARK OFFICE
CERTIFICATE OF CORRECTION

PATENT NO. : 5,452,280
DATED : September 19, 1995
INVENTOR(S) : Yamamori et al

It is certified that error appears in the above-indentified patent and that said Letters Patent is hereby corrected as shown below:

Title Page, item [73], Assignee: SONY CORPORATION
                                 Tokyo, Japan Signed and Sealed this Twenty-first Day of May, 1996

Attest:

BRUCE LEHMAN

Attesting Officer        Commissioner of Patents and Trademarks